(12) United States Patent
Nishimoto

(10) Patent No.: US 6,767,482 B2
(45) Date of Patent: Jul. 27, 2004

(54) INJECTION COMPRESSION MOLDING METHOD AND INJECTION COMPRESSION MOLDING MACHINE

(75) Inventor: Tatsuo Nishimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 344 days.

(21) Appl. No.: 09/999,218

(22) Filed: Nov. 30, 2001

(65) Prior Publication Data

US 2002/0036360 A1 Mar. 28, 2002

Related U.S. Application Data

(63) Continuation of application No. 09/342,412, filed on Jun. 29, 1999, now abandoned.

(30) Foreign Application Priority Data

Jul. 1, 1998 (JP) .......................................... 10-186206

(51) Int. Cl.[7] .......................... B29D 11/00; B29C 45/23
(52) U.S. Cl. .................... 264/2.2; 264/40.1; 264/328.7; 425/145; 425/562; 425/808
(58) Field of Search ....................... 264/1.1, 2.2, 328.7, 264/40.1; 425/808, 145, 555, 562

(56) References Cited

U.S. PATENT DOCUMENTS

| | | | |
|---|---|---|---|
| 5,093,049 A | 3/1992 | Uehara et al. | |
| 5,415,817 A | 5/1995 | Shiao et al. | |
| 5,776,407 A | 7/1998 | Takeda | |
| 5,972,252 A | 10/1999 | Saito et al. | |
| 6,210,610 B1 | 4/2001 | Saito et al. | |

FOREIGN PATENT DOCUMENTS

| | | |
|---|---|---|
| EP | 0 778 119 A1 | 6/1997 |
| JP | A-57-72831 | 5/1982 |
| JP | A-58-94436 | 6/1983 |
| JP | A-59-78827 | 5/1984 |
| JP | A-61-66623 | 4/1986 |
| JP | A-62-16119 | 1/1987 |
| JP | A-2-26723 | 1/1990 |
| JP | Y2-6-9826 | 3/1994 |
| JP | A-6-71698 | 3/1994 |
| JP | A-6-328535 | 11/1994 |

*Primary Examiner*—Mathieu D. Vargot
(74) *Attorney, Agent, or Firm*—Oliff & Berridge PLC

(57) ABSTRACT

An injection compression molding method for injecting and compressing molten resin to obtain molding product using a molding die internally having a lens-forming cavity includes a pair of relatively movable inserts; a gate; a runner; and a sprue. The molten resin is injected and filled into the cavity and volume of the cavity is reduced by moving one insert toward the other insert after a time period prior to completion of injecting and filling the molten resin. At the time, a gate shut pin is protruded into the gate in synchronization with the movement of the insert to gradually close the opening of the gate. Accordingly, two demands, i.e. lower resistance in filling the cavity with the molten resin and shutting in the molten resin after the molten resin is packed in the cavity, can both be satisfied. This improves productivity and enables the production of mold products having highly accurate configuration and high quality.

20 Claims, 20 Drawing Sheets

F I G. 1
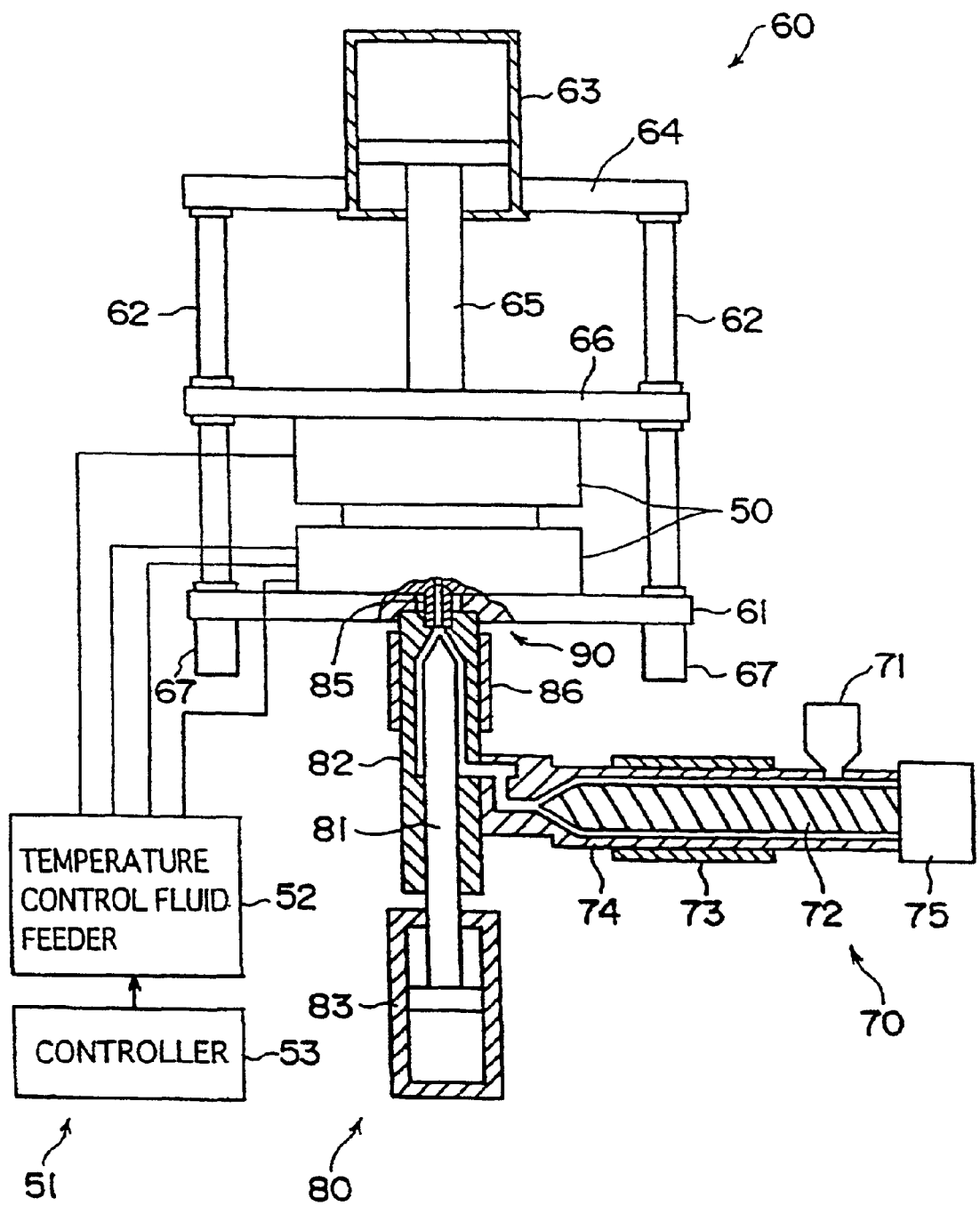

F I G. 14
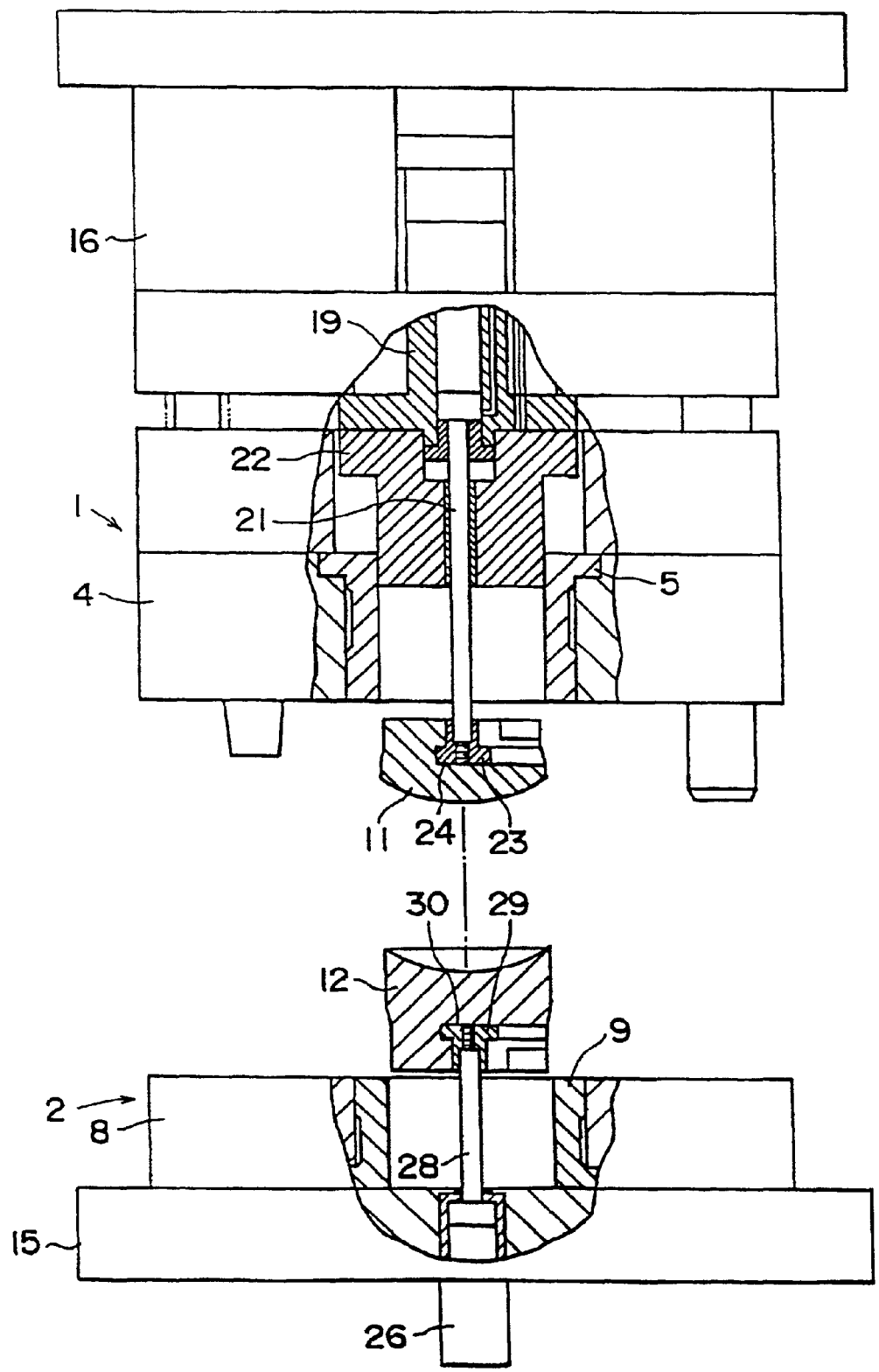

F I G. 21
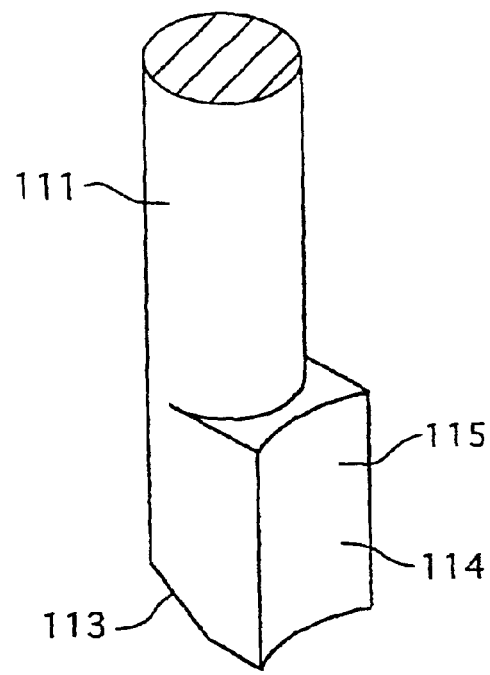
F I G. 22
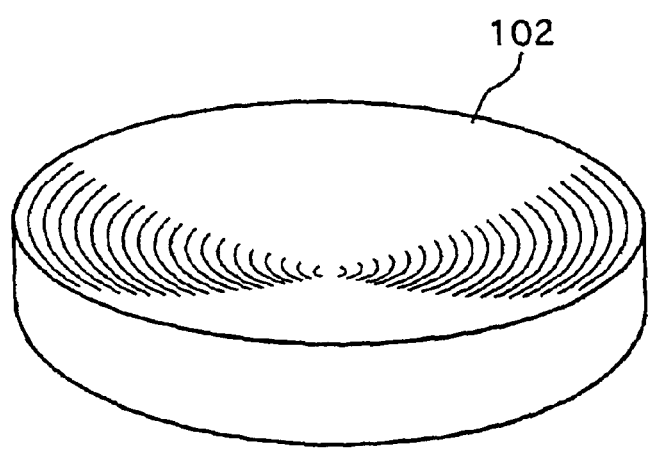

INJECTION COMPRESSION MOLDING METHOD AND INJECTION COMPRESSION MOLDING MACHINE

This application is a continuation from application Ser. No. 09/342,412, filed Jun. 29, 1999 now abandoned.

1. Field of the Invention

The present invention relates to an injection compression molding method and an injection compression molding machine for molding products by molding thermoplastic resin being injected and compressed.

2. Description of Related Art

Injection compression molding method is known as a molding method for obtaining lenses from thermoplastic resin as disclosed in Japanese Patent Publication Laid-Open No. Hei 2-26723 and Japanese Utility Model No. Hei 6-9826. Incidentally, spectacle lenses having lens power ranging from +4.00 to −8.00 D(D: diopter) are preferably used for the molding method.

The injection compression molding method is a molding method for correcting shrinkage of the molten resin to obtain uniform and highly accurate configuration, in which molds are closed while retaining a predetermined compression margin in a lens forming cavity and, subsequently to injecting the molten resin to fill the lens forming cavity, the compression margin is compressed to obtain lenses.

Incidentally, when curvature of front side and rear side of the lens differ, thickness difference is caused to the thickness of the lens. As lenses having the thickness difference, there are two kinds of lenses, i.e. a plus lens having thicker central portion than peripheral portion thereof and a minus lens having thinner central portion than peripheral portion thereof.

The lens thickness differs according to a design of an optical lens. For instance, an aspheric lens having refractivity of approximate 1.50 and lens power of +2.00 D has approximate central thickness of 4.2 mm and approximate peripheral thickness of 1.0 mm. When the lens power is −2.00 D, the central thickness is designed to be approximately 1.4 mm and the peripheral thickness is designed to be approximately 4.8 mm. When the lens power is −4.00 D, the central thickness is designed to be approximately 1.44 mm and the peripheral thickness is designed to be approximately 7.9 mm.

In injection-compression-molding such lenses having the thickness difference, following disadvantage occurs according to difference in configuration characteristics.

Since the peripheral portion of the plus lens is thinner than the central portion thereof, a deformation containing molding shrinkage called "hi-ke" (surface sink) is likely to be caused around the gate in molding plus lenses, thereby making it difficult to keep configuration accuracy of the peripheral portion.

Since the central portion of the minus lens is thinner than the peripheral portion thereof, central portion of the cavity has greater flow resistance. Therefore, the molten resin injected into the cavity flows to branch into the peripheral portion and around into the central portion on account of difficulty of flowing the central portion of the cavity, thereby often causing weld mark in the central portion.

Accordingly, conventional molding die for the plus lens has a small gate opening configuration in order to restrain the development of the "hi-ke" (surface sink).

On the other hand, since the weld mark tends to be generated when the molten resin is not smoothly flown into the cavity, conventional molding die for the minus lens has a relatively large gate opening configuration in order to ensure the fluidity of the molten resin.

However, since there is delicate difference in the gate opening configuration according to lens thickness difference, numerous molding dies having different gate opening configuration have to be prepared, thereby increasing financial burden.

In view of the above, the Applicant of the present application has proposed an injection molding die for molding lens, in which the gate portion is arranged to be exchangeable (Japanese Patent Application No. Hei 8-6407).

The gate portion of the molding die is arranged to be exchangeable. Furthermore, a plurality type of gate top member for defining the gate opening configuration is prepared in advance. A gate top member having gate opening configuration corresponding to the lens configuration to be molded is selected from the gate top members and is exchangeably attached to the gate portion of the molding die.

However, even when the gate top member is selected in accordance with configuration property of the lens to be molded, the gate top member has to be exchanged in accordance with the lens configuration to cause much trouble, and the productivity can not be greatly improved.

Further, it is usually preferable that the gate is arranged to have small resistance in filling the cavity with the molten resin and the molten resin is preferably shut in the cavity after the cavity is packed with the molten resin. Accordingly, the configuration and the size of the gate has to be determined by a compromise between the conflicting demands.

Accordingly, as mentioned above, even when the gate top members having the gate opening configuration in accordance with the lens configuration are prepared in advance, since the gate opening configuration has to be determined by an appropriate compromise of the contradictory demands, the contradictory demands can not be satisfied simultaneously. Further, in order to satisfy the demands as best as possible, the gate opening configuration gets too complicated, thereby increasing production cost.

SUMMARY OF THE INVENTION

The object of the present invention is to provide an injection compression molding method and injection compression molding machine for solving the above-mentioned conventional problem to improve the productivity and for obtaining molding products having high configuration accuracy and high quality.

The present invention is made by taking notice of the fact that both of the above two demands for the gate (fewer or lower resistance in filling the molten resin into the cavity and shutting in the molten resin after the molten resin is packed in the cavity) can be met utilizing time lag between the respective demands, in which the opening of the gate is closed after injecting and filling the molten resin into the cavity.

A injection compression molding method according to the present invention includes the following steps: providing an openable/closable molding die having at least one cavity including a pair of relatively movable cavity forming member and a resin flow channel in communication with the cavity through a gate; closing the molding die; setting a size of the cavity by relatively moving the pair of cavity forming members to form a predetermined compression margin inside the cavity; injecting molten resin to fill the cavity; and at least after a time point prior to completion of injection of the molten resin, reducing the size of the cavity by relatively moving the pair of cavity forming members to compress the molten resin. The present invention is characterized in that an opening of the gate is shut after completion of injecting the molten resin; and the gate shut operation is conducted in synchronization with the relative movement of the pair of cavity forming member in reducing the size of the cavity.

In the above, the shutting timing of the opening of the gate is set after completion of injection of the molten resin, more preferably, immediately after completion of injection of the molten resin, and the shutting action of the opening of the gate may be initiated before completion of injecting the molten resin.

When the opening of the gate is closed, a clearance enough to prevent the molten resin injected and filled in the cavity from flowing back to the resin channel from the gate during cooling process, preferably a clearance of less than or the same as 2 mm may be secured. Or alternatively, the opening of the gate may be completely closed.

Further, the number of the cavity may either be single or plural. The type of the cavity is not limited, but a lens-forming cavity having meniscus shape, which requires high accuracy and high quality, is preferably employed.

According to the injection compression molding method, since the size of the cavity is initially set; the molten resin is injected and filled into the cavity; the opening of the gate is closed in synchronization with the relative movement of the cavity forming member in reducing the cavity volume to compress the molten resin; and the opening of the gate is closed after completion of the injection of the molten resin etc., the molten resin can be prevented from flowing back to the resin flow channel from the gate in the cooling process. Accordingly, a product having high accuracy and high quality can be molded restraining development of internal strain.

Therefore, since the opening configuration of the gate opening in flowing the molten resin into the cavity can be determined considering only fluidity of the molten resin, the gate opening configuration and the size are not required to be changed in accordance with the configuration of the products to be molded. Accordingly, for instance, the conventional process of changing gate top member having gate opening configuration corresponding to the configuration of the lens is not required, thereby improving the productivity.

In the above injection compression molding method, the shutting operation of the gate may be conducted in direct link with the relative movement of the pair of the cavity forming member in reducing the cavity, or alternatively, by a second driving means independent of a first driving means for relatively moving the pair of cavity forming member in reducing the size of the cavity.

According to the above, the opening of the gate can be shut after completion of injection of the molten resin. For instance, when the cavity volume is reduced after completion of injecting the molten resin, the opening of the gate can be closed after initiation of reducing the cavity volume. When the cavity volume is reduced before completion of injecting the molten resin, the opening of the gate can be initiated to be closed after initiation of reducing the cavity volume and the opening of the gate can be closed after the molten resin is completely injected.

Accordingly, when the molten resin inside the cavity is gradually compressed by the relative movement of the pair of cavity forming member to increase the pressure applied to the molten resin, since the opening of the gate is closed, the resin can be securely prevented from flowing back to the resin channel from the gate.

Another injection compression molding method includes following steps: providing an openable/closable molding die having at least one cavity including a pair of relatively movable cavity forming member and a resin flow channel in communication with the cavity through a gate; closing the molding die; setting a size of the cavity by relatively moving the pair of cavity forming member to form a predetermined compression margin inside the cavity; injecting molten resin to fill the cavity; and at least after a time point prior to completion of injection of the molten resin, reducing the size of the cavity by relatively moving the pair of cavity forming member to compress the molten resin. The injection compression molding method is characterized in that the predetermined margin inside the cavity and an opening space of the gate is set in accordance with configuration property of the lens to be molded, that an opening of the gate is shut after completion of injecting the molten resin, and that the gate shut operation is conducted in synchronization with the relative movement of the pair of cavity forming member in reducing the size of the cavity.

According to the injection compression molding method, even when the predetermined compression margin inside the cavity and the opening space of the gate is set in accordance with configuration property of the lens, e.g. plus lens and minus lens, or even when the opening space of the gate is opened when the predetermined margin inside the cavity is set as, for instance, approximately 0.1 mm when the lens power is +2.00 D, set as approximately 7 mm when the lens power is −2.00 D, and set as approximately 12 mm when the lens power is −4.00 D, the molten resin can be prevented from flowing back to the resin channel from the gate, since the opening of the gate is closed after completion of injecting the molten resin. Further, above setting is preferably changed in accordance with material property such as fluidity of the resin of the lens. Accordingly, the predetermined compression margin inside the cavity and the opening space of the gate can be selectively set in accordance with the configuration of the lens without considering backflow of the molten resin from the gate to the resin flow channel.

For instance, in molding the plus lens, the configuration of the opening of the gate can be set small in order to restrain the "hi-ke" (surface sink) as least as possible. In molding minus lens, the predetermined compression margin in the cavity and the opening space of the gate can be set large. Incidentally, when the predetermined margin in the cavity and the opening space of the gate is set large in molding minus lens, the resin fluidity at the gate can be secured since the molten resin flows into the cavity through the large-set gate. Further, since the molten resin flowing into the cavity can be flown into peripheral portion thereof through the central portion of the cavity without branching by virtue of the greatly-set space in the cavity, the development of the weld mark at the central portion can be prevented.

In the above injection compression molding method, the opening space of the gate may be driven and controlled by a second driving means independent of a first driving means for setting and reducing the size of the cavity, and the shutting operation of the gate may be conducted by the second driving means.

Accordingly, since the opening space of the gate can be selectively set as a desired size independently of the cavity size setting process and the opening of the gate can be shut after completion of injecting the molten resin, the molten resin can be securely prevented from flowing back to the resin flow channel from the gate by virtue of the closed opening of the gate even when the pressure applied to the molten resin increased.

In the above, the configuration of the lens may be defined by a grouped unit of a plurality of approximate lens power.

Accordingly, the predetermined compression margin in the cavity and the opening space of the gate can be selectively set for each unit of the lens power. In other words, since the molding condition can be changed in accordance with the lens power, the lens can be molded with higher accuracy.

An injection compression molding machine according to the present invention has an openable/closable molding die having at least one cavity including a pair of relatively movable cavity forming member and a resin flow channel in communication with the cavity through a gate, a cavity setting means for closing the molding die and for relatively moving the pair of cavity forming member to set the size of the cavity so that a predetermined compression margin is formed inside the cavity, an injection means for injecting a molten resin to fill the cavity set by the cavity setting means, a cavity reduction means for relatively moving the pair of the cavity forming member to reduce the size of the cavity at least after a time point prior to completion of injecting the molten resin, and a gate control means for shutting an opening of the gate after completion of injecting the molten resin in synchronization of the relative movement of the pair of cavity forming member in reducing the size of the cavity.

According to the injection compression molding machine, the molding die is closed and the size of the cavity is set by relatively moving a pair of cavity forming member. Subsequently, after the molten resin is injected and filled in the cavity, the molten resin is compressed by relatively moving the pair of cavity forming member at least after a time point prior to completion of injecting the molten resin. In the above, since the opening of the gate is closed after completion of injecting the molten resin, the molten resin can be prevented from flowing back to the resin flow channel from the gate. Accordingly, a product having high accuracy and high quality can be molded by restraining development of internal strain. Further, since the conventional exchanging step of the gate top member having a gate opening configuration corresponding to the lens configuration is not required, the productivity can be improved.

In the above, though any arrangement is possible for the gate control means as long as the opening of the gate can be shut after completion of injecting the molten resin, the gate control means preferably includes a gate shut member protrudable into the gate, the gate shut member being fixed to a movable-side cavity forming member of the pair of the cavity forming member.

In the above, the gate shut member can be easily synchronized with the relative movement of the cavity forming member by fixing to a movable-side cavity forming member of the pair of cavity forming member. Accordingly, since the gate shut member protrudes into and retreats from the gate by the relative movement of the cavity forming member, the gate opening configuration can be determined when the pair of cavity forming member relatively moves by the cavity setting means. Therefore, the opening configuration of the gate during the flowing step of the molten resin into the cavity can be selectively set by determining the protruding amount of the gate shut member protruding into the gate.

Alternatively, the gate control means may have a gate shut member protrudable into the gate, the gate shut member being provided to a movable-side cavity forming member of the pair of the cavity forming member movably in a movable direction of the movable-side cavity forming member, and a driving means for moving the gate shut member independently of the movable-side cavity forming member.

Accordingly, as mentioned above, since the opening of the gate can be shut after completion of injecting the molten resin, the molten resin can be securely prevented from flowing back into the resin flow channel from the gate by virtue of the closed opening of the gate even when the pressure applied to the molten resin increased by the relative movement of the pair of the cavity forming member to compress the molten resin.

Further, the pair of cavity forming member may preferably be optical inserts for molding spectacle lens disposed in the molding die independently of the gate, the optical insert being exchangeable in accordance with a power of the lens to be molded.

Accordingly, the spectacle-lens forming optical insert can be exchanged in accordance with the lens power of the spectacle lens, and, furthermore, since the gate and the gate shut member can be continuously used, the gate shut member is not required to be exchanged for each time the insert is exchanged.

BRIEF DESCRIPTION OF THE DRAWINGS

FIG. 1 is an illustration of an injection compression machine being applied with a method according to an embodiment of the present invention;

FIG. 14 is an illustration of condition in exchanging an insert in the aforesaid embodiment;

FIG. 21 is a perspective view showing a gate shut pin used in FIG. 20; and

FIG. 22 is a perspective view molded according to FIGS. 20 and 21.

DETAILED DESCRIPTION OF PREFERRED EMBODIMENT(S)

Figure 2:
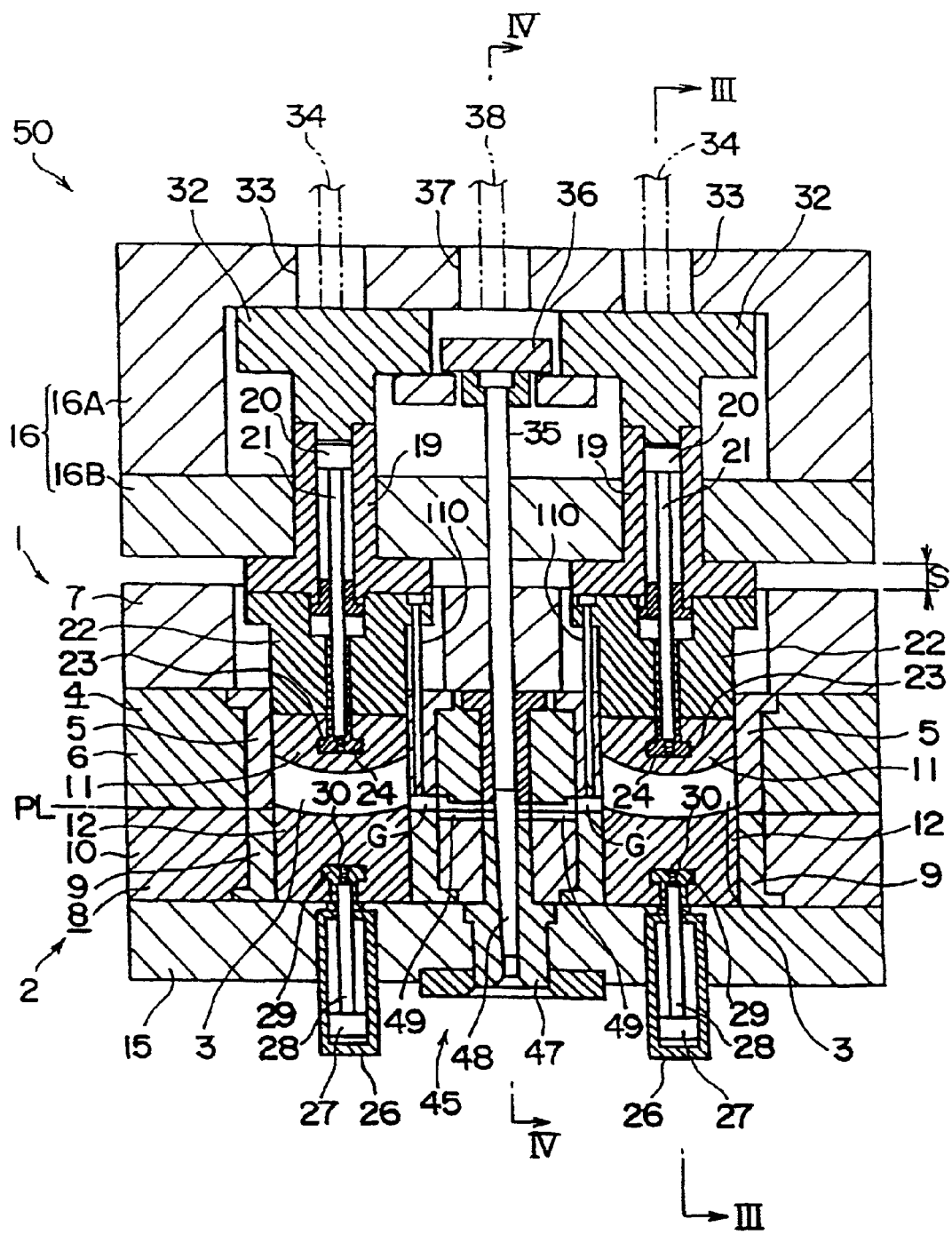
FIG. 2 is a cross-section showing an injection molding die according to the aforesaid embodiment.

An embodiment of the present invention will be described below with reference to attached drawings.

The present embodiment is an injection compression molding machine for molding spectacle lens (meniscus-shaped spectacle lens: single focus, multi-focus, and progressive multi-focus) applied with the injection compression molding method according to the present invention. FIG. 1 shows an entire arrangement of the present embodiment. Incidentally, the material of the spectacle lens being molded is thermoplastic resin such as PMMA (polymethyl methacrylate) and PC (polycarbonate). Further, low-pressure output injection is used in the present embodiment in order to prevent striae and optical distortion etc.

The injection compression molding machine according to the present embodiment has a clamping apparatus 60 having an injection molding die 50, a plasticized apparatus 70 for plasticizing the material resin, an injection apparatus 80 as an injection means for measuring the molten resin plasticized by the plasticizing apparatus 70 to inject into and fill the injection molding die 50, and a mold temperature controller 51 for controlling the temperature of the injection molding die 50 to a predetermined temperature.

The clamping apparatus 60 has a stationary die plate 61, a cylinder fixing plate 64 fixed to the stationary die plate 61 through a plurality of tie bars 62 and having clamping cylinder 63 mounted thereon, and a movable die plate 66 elevatably disposed along the tie bars 62 and connected to piston rod 65 of the clamping cylinder 63. The stationary die plate 61 has a hydraulic auxiliary cylinder 67 for pushing up the movable die plate 66 against clamping force of the clamping cylinder 63. Incidentally, the injection molding die 50 is disposed between the stationary die plate 61 and the movable die plate 66. A cavity setting means and a cavity volume reducing means includes the clamping apparatus 60 and the hydraulic auxiliary cylinder 67.

The plasticizing apparatus 70 has a plasticizing cylinder 74 for plasticizing and kneading the material resin supplied from a hopper 71 by a heater 73 while feeding by a screw 72. Incidentally, the screw 72 is rotated by a hydraulic motor 75.

The injection apparatus 80 has an injection cylinder 82 having a plunger 81 thereinside, and a hydraulic cylinder 83 for slidably moving (moving up and down) the plunger 81 of the injection cylinder 82. An injection nozzle 85 is mounted on an end (upper end) of the injection cylinder 82. Further, a band heater 86 is wound at an upper outside of the injection cylinder 82.

The mold temperature controller 51 has a temperature control fluid feeder 52 for feeding temperature control fluid (heating fluid and cooling fluid) to the injection molding die 50, and a controller 53 for commanding the temperature of the temperature control fluid to be supplied from the temperature fluid feeder 52 to respective portions of the molding die 50. A plurality of mold temperature control curves are stored in advance in the controller 53 in accordance with the type of the lens to be molded. Accordingly, when any one of the mold temperature control curves is designated, the temperature of the temperature control fluid supplied from the temperature control fluid feeder 52 to respective parts of the molding die 50 (below-mentioned insert guide member 5, 9, upper insert 11, lower insert 12 etc.) is controlled according to the designated mold temperature control curve.

Figure 3:
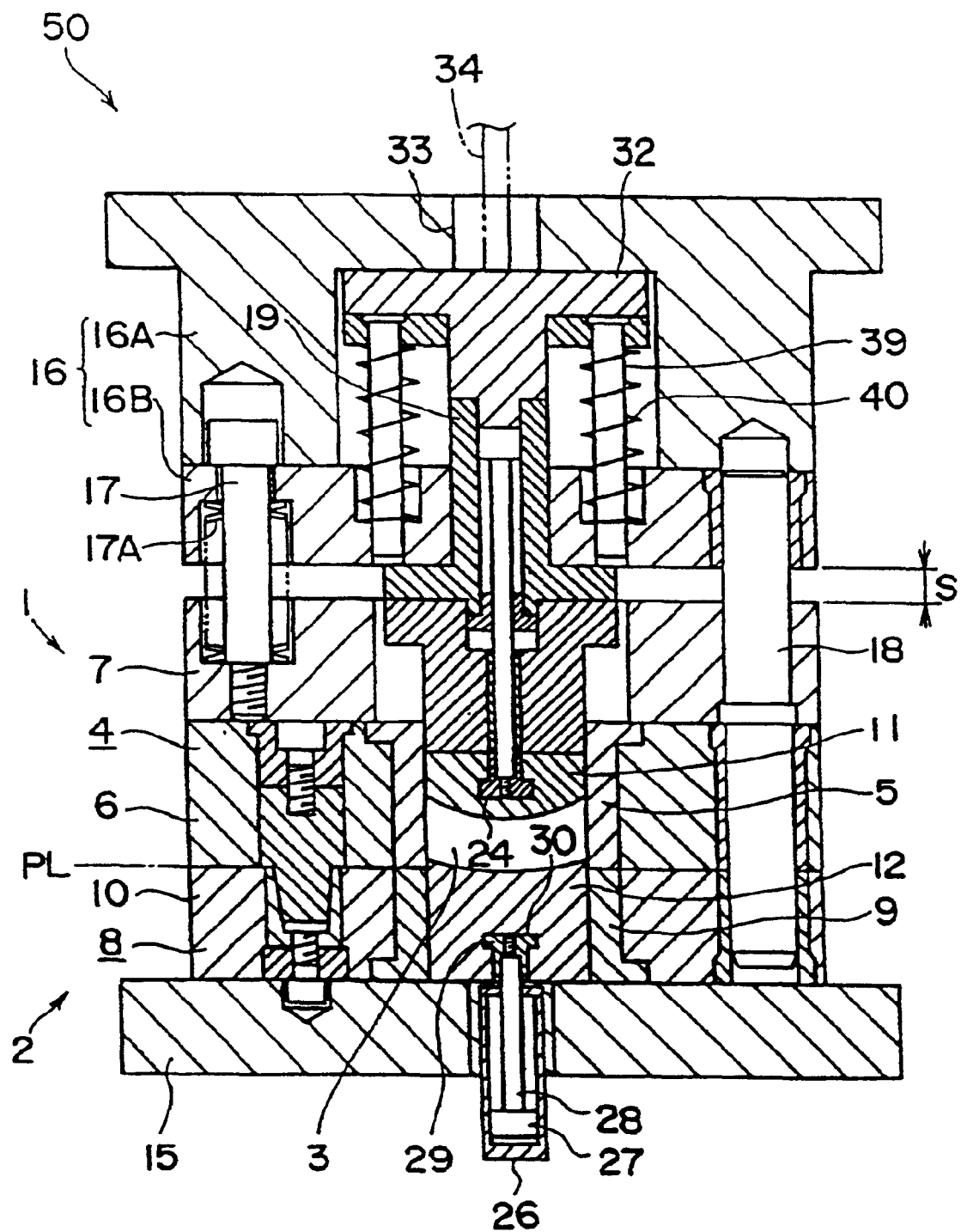
FIG. 3 is a cross-section taken along III—III line in FIG. 2.
Figure 4:
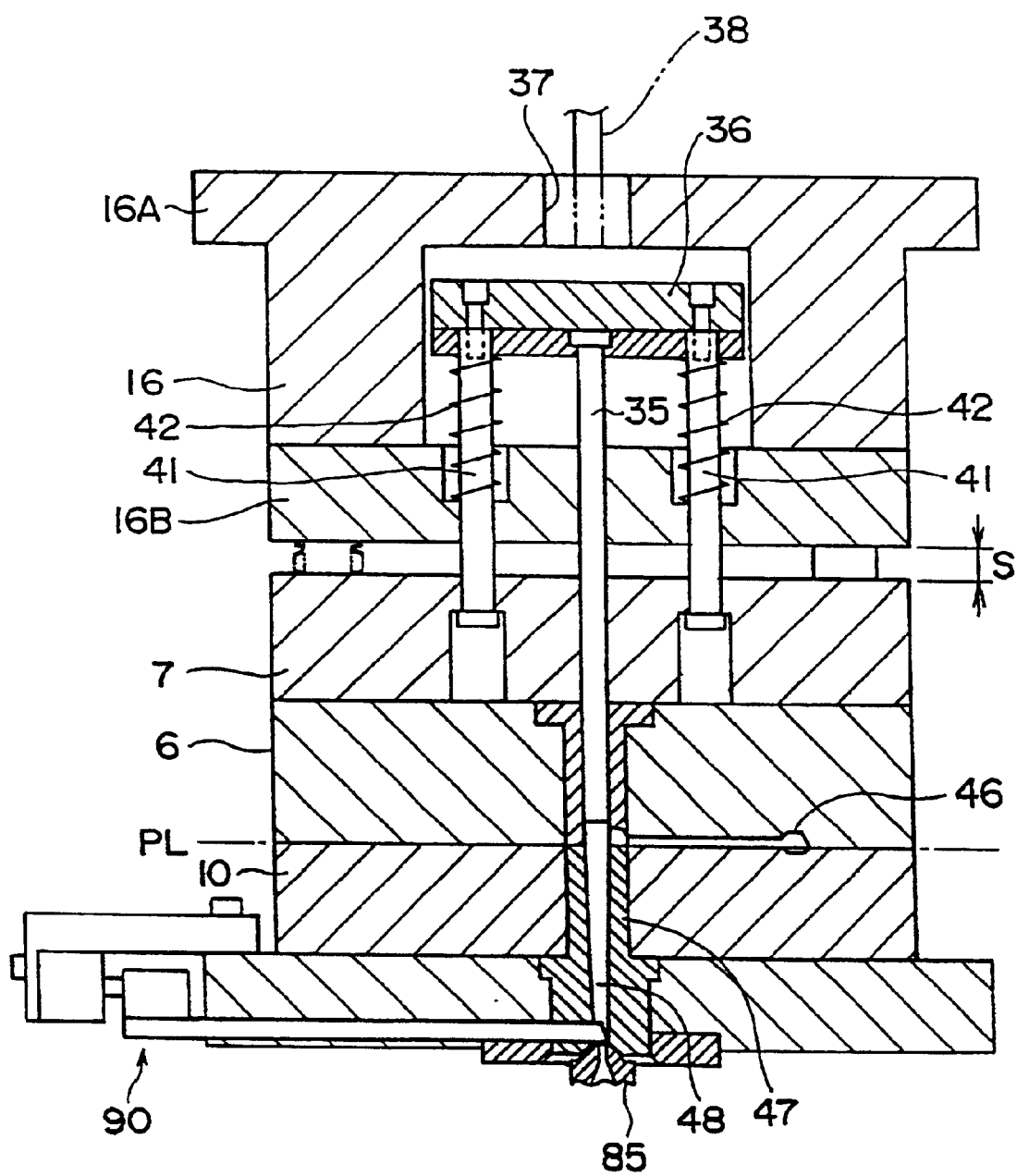
FIG. 4 is a cross-section taken along IV—IV line in FIG. 2.

FIG. 2 is a cross-section of the injection molding die 50, FIG. 3 is a cross-section taken along III—III line in FIG. 2, and FIG. 4 is a cross-section taken along IV—IV line in FIG. 2.

The injection molding die 50 has an upper mold (movable mold) 1 and a lower mold (stationary mold) 2 being divided up and down by a parting line PL. Two spectacle-lens molding cavities 3 and a runner 49 connected to the respective spectacle-lens forming cavity 3 through a gate G to connect the cavities 3 are formed between the upper mold 1 and lower mold 2. A sprue 48 formed of a sprue bush 47 is perpendicularly formed on the runner 49 and a grip portion 46 (see FIG. 4) is also formed perpendicularly thereto. Accordingly, a moldset 45 having two spectacle-lens forming cavities 3, the runner 49, the sprue 48 and the grip portion 46 is formed. Incidentally, the runner 49 and the sprue 48 forms a resin flow channel inside the injection molding die 50.

A die body 4 of the upper mold 1 is composed of an insert guide member 5 and die plates 6 and 7. A die body 8 of the lower mold 2 is composed of an insert guide member 9 and die plate 10. Respective insert guide members 5 and 9 have a spectacle-lens molding optical inserts 11 and 12 as a cavity forming member for forming the cavity 3 being accommodated thereinside to be slidably movable in an direction perpendicular to the parting line PL. Incidentally, though not shown, the insert guide members 5 and 9 and the inserts 11 and 12 etc. have a temperature control fluid circulating groove for circulating the temperature control fluid supplied from the temperature fluid feeder 52.

The die body 8 of the lower mold 2 is fixed to a die fitting member 15 fixed onto the stationary die plate 61. The die body 4 of the upper mold 1 is connected to a die fitting member 16 composed of an upper member 16A and a lower member 16B by a bolt 17 shown in FIG. 3. A plate spring 17A inserted around an outside of the bolt 17 is attached between the die body 4 and the die fitting member 16. The die fitting member 16 is fixed to the movable die plate 66, to which a downward clamping force by the clamping cylinder 63 and an upward lifting force by the hydraulic auxiliary cylinder 67 work.

A margin S is secured between the die body 4 and the die fitting member 16. The die body 4 and the die fitting member 16 is vertically opened and closed by the margin S guided by a guide pin 18. In other words, a predetermined margin S is formed by lowering the movable die plate 66 after closing the die. The margin S is closed by lowering the die fitting member 16 through the movable die plate 66 by downward clamping force of the clamping cylinder 63 generated during compression.

A downward hydraulic cylinder 19 is attached to the die fitting member 16 to be movable vertically. A piston rod 21 connected to a piston 20 of the hydraulic cylinder 19 penetrates an inside of a back insert 22 fixed to a lower side of the cylinder 19 and has a T-shaped clamp member 23 at an end thereof. The T-shaped clamp member 23 is separably engaged to a T-shaped groove 24 formed on an upper end face of the insert 11. Accordingly, the insert 11 is made to be exchangeable.

An upward hydraulic cylinder 26 is attached to the die fitting member 15. A piston rod 28 connected to a piston 27 of the hydraulic cylinder 26 penetrates an inside of the die fitting member 15, the piston rod 28 having a T-shaped clamp member 29 at an end thereof. The T-shaped clamp member 29 is separably engaged to a T-shaped groove 30 formed to a lower end surface of the insert 12, thereby making the insert 12 to be exchangeable.

A pressure receiving member 32 is fixed to an upper end of the hydraulic cylinder 19. When the pressure receiving member 32 is pushed down by an eject rod 34 inserted from a hole 33 formed to the die fitting member 16, the hydraulic cylinder 19, the back insert 22 and the insert 11 are also pushed down so that a lens molded in the cavity 3 is ejected when the upper mold 1 and the lower mold 2 are separated.

An eject pin 35 is disposed at a center of the upper mold 1 and the die fitting member 16 to be vertically movable. A pressure receiving member 36 capable of being descended by a predetermined stroke from an upper limit position is fixed to an upper end of the eject pin 35. When the pressure receiving member 36 is pushed down by an eject rod 38 inserted from a hole 37 formed to the die fitting member 16, the eject pin 35 is pushed down.

Incidentally, a spring force of a spring 40 wound around an outer circumference of the eject return pin 39 works upward to the pressure receiving member 32. Further, as shown in FIG. 4, a spring force of a spring 42 wound around a circumference of the eject return pin 41 works upward to the pressure receiving member 36 and the pressure receiving member 36 is positioned at a predetermined position. Accordingly, when the eject rods 34 and 38 rise, the pressure receiving members 32 and 36 also rises to return to old position.

Figure 5:
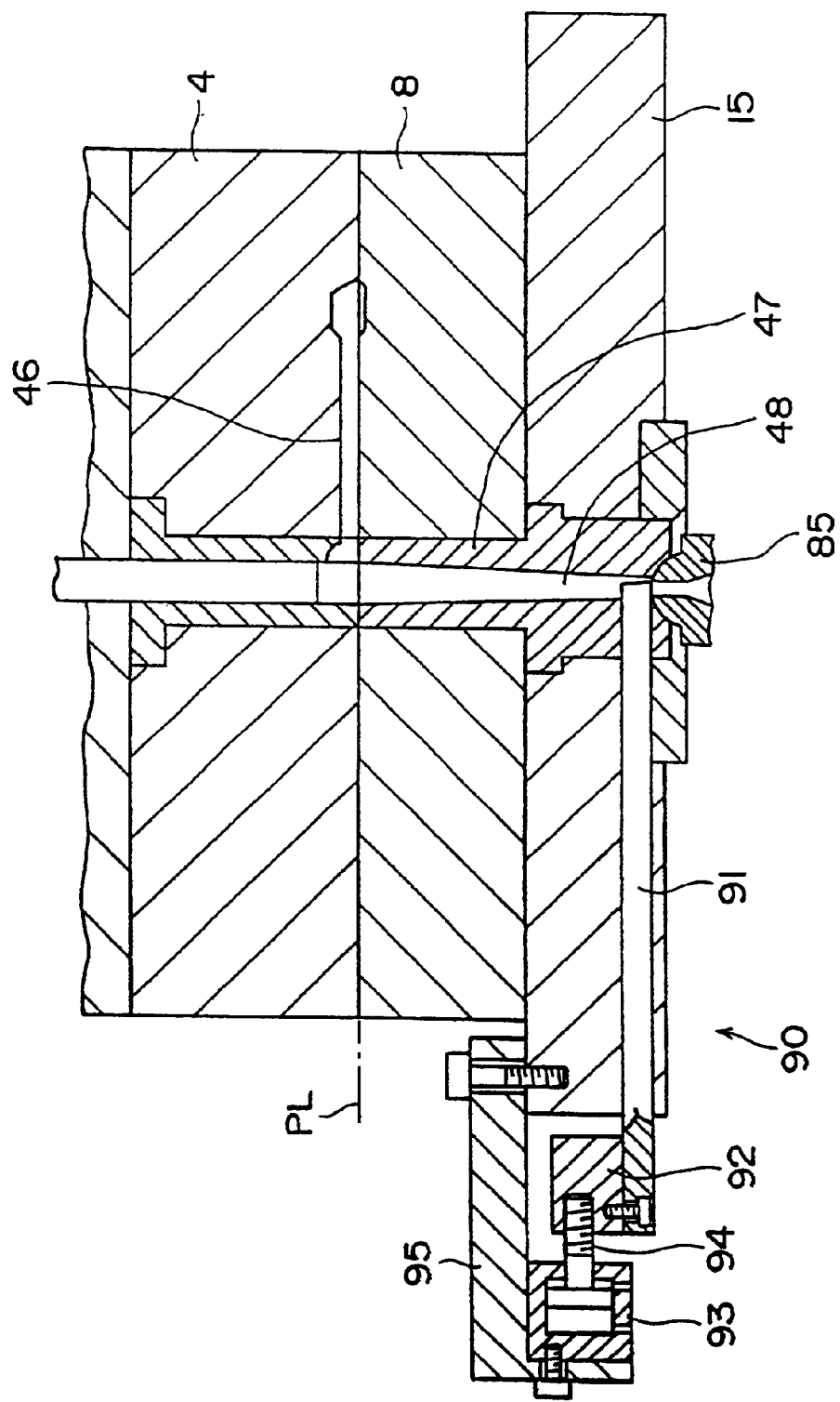
FIG. 5 is an enlarged cross-section showing a nozzle shut mechanism according to the aforesaid embodiment.
Figure 6:
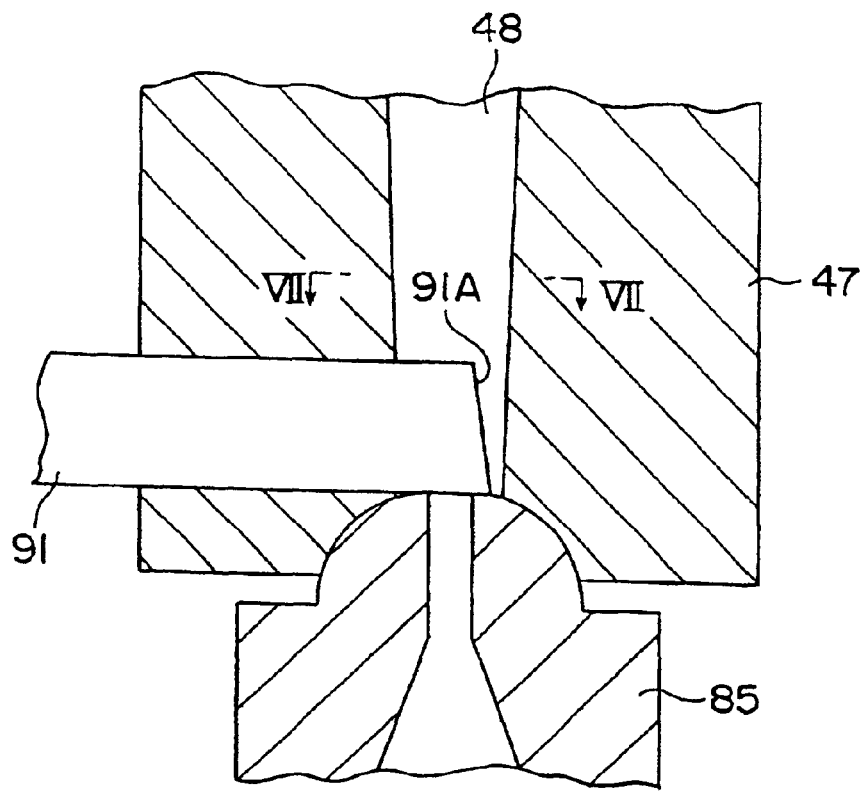
FIG. 6 is an enlarged view showing principle part of FIG. 5.
Figure 7:
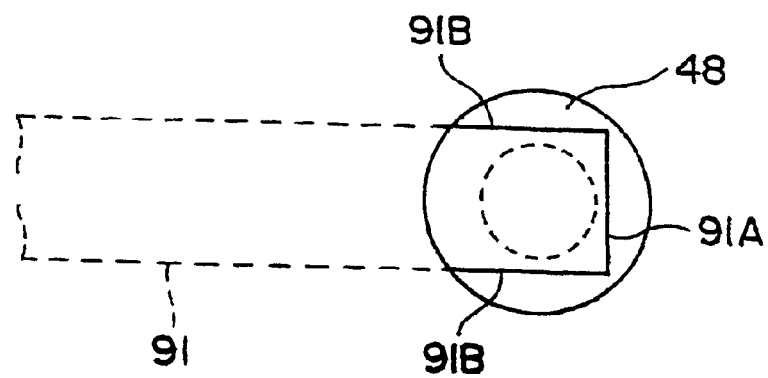
FIG. 7 is a cross-section taken along VII—VII line in FIG. 6.

FIG. 5 shows a nozzle shut mechanism 90. The nozzle shut mechanism 90 has a nozzle shut pin 91 as a blocking member. The nozzle shut pin 91 is inserted to a side of the sprue bush 47 advanceably in a direction approximately perpendicular to a central line of the sprue bush 47, and a rear end of the nozzle shut pin 91 is connected to a piston rod 94 of a hydraulic cylinder 93 through a connection piece 92. Back-flow of the resin is prevented by a slide of the nozzle shut pin 91 to close an end opening of the injection nozzle 85 when the injection nozzle 85 is pressed to abut the sprue bush 47. In this case, as shown in FIG. 6 and FIG. 7, an end surface 91A and an end side 91B of the nozzle shut pin 91 is arranged not to contact an inner wall of the sprue bush 47 (sprue 48).

Figure 8:
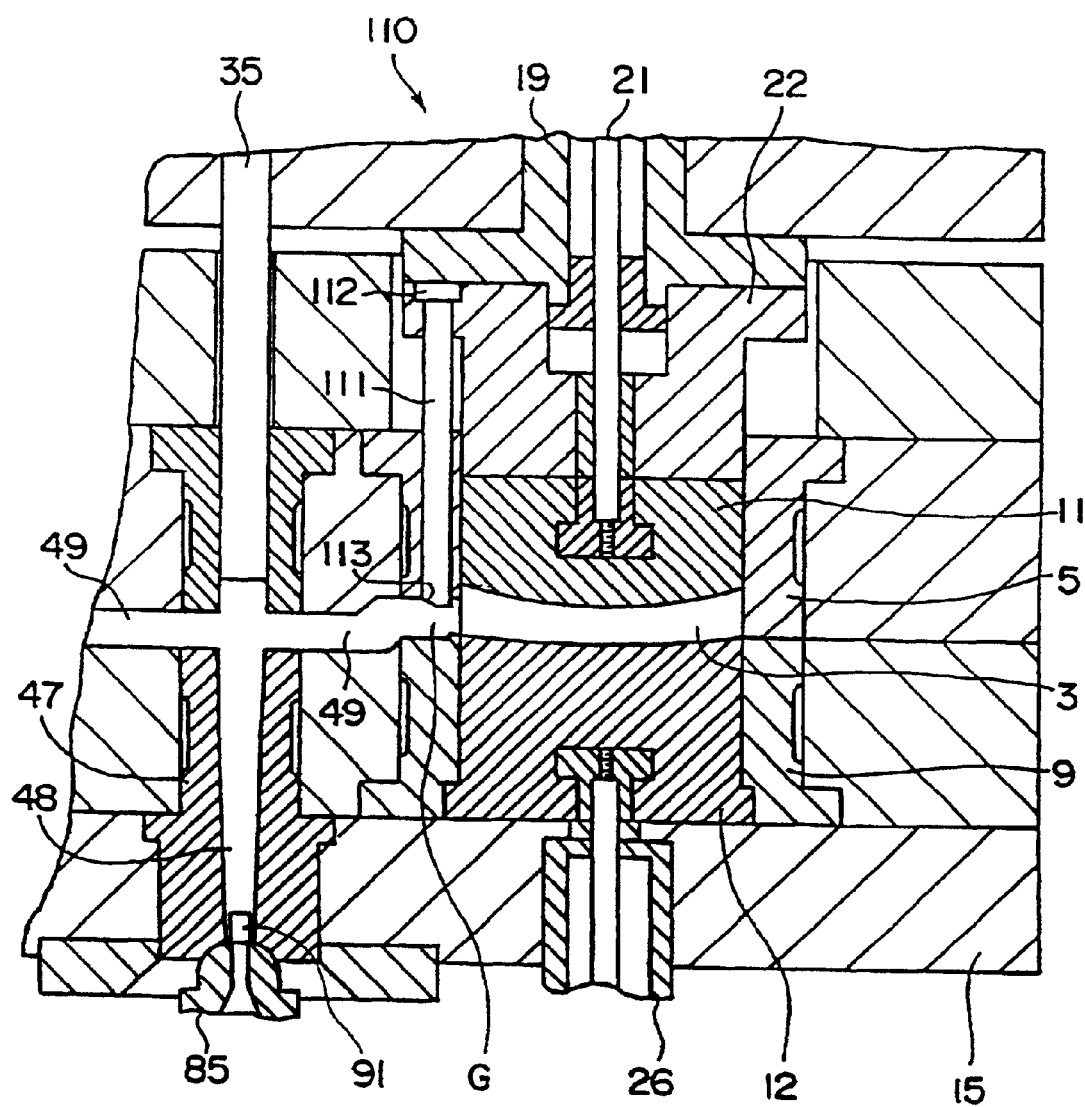
FIG. 8 is an enlarged cross-section showing a condition in molding minus lens in the aforesaid embodiment.

FIG. 8 shows a gate shut mechanism 110. The gate shut mechanism 110 composes a gate control means for closing an opening configuration of the gate G after completion of injecting the molten resin, which includes a gate shut pin 111 as a gate shut member protrudable into the gate G. The gate shut pin 11 is fixed by an upper end 112 thereof being sandwiched by the back insert 22 and the cylinder 19. A lower end of the gate shut pin 111 penetrates the insert guide member 5 to be protrudable into the gate G and has a slope 113 gradually sloped downward from the gate G to the cavity 3 at a protruding end thereof.

Figure 9:
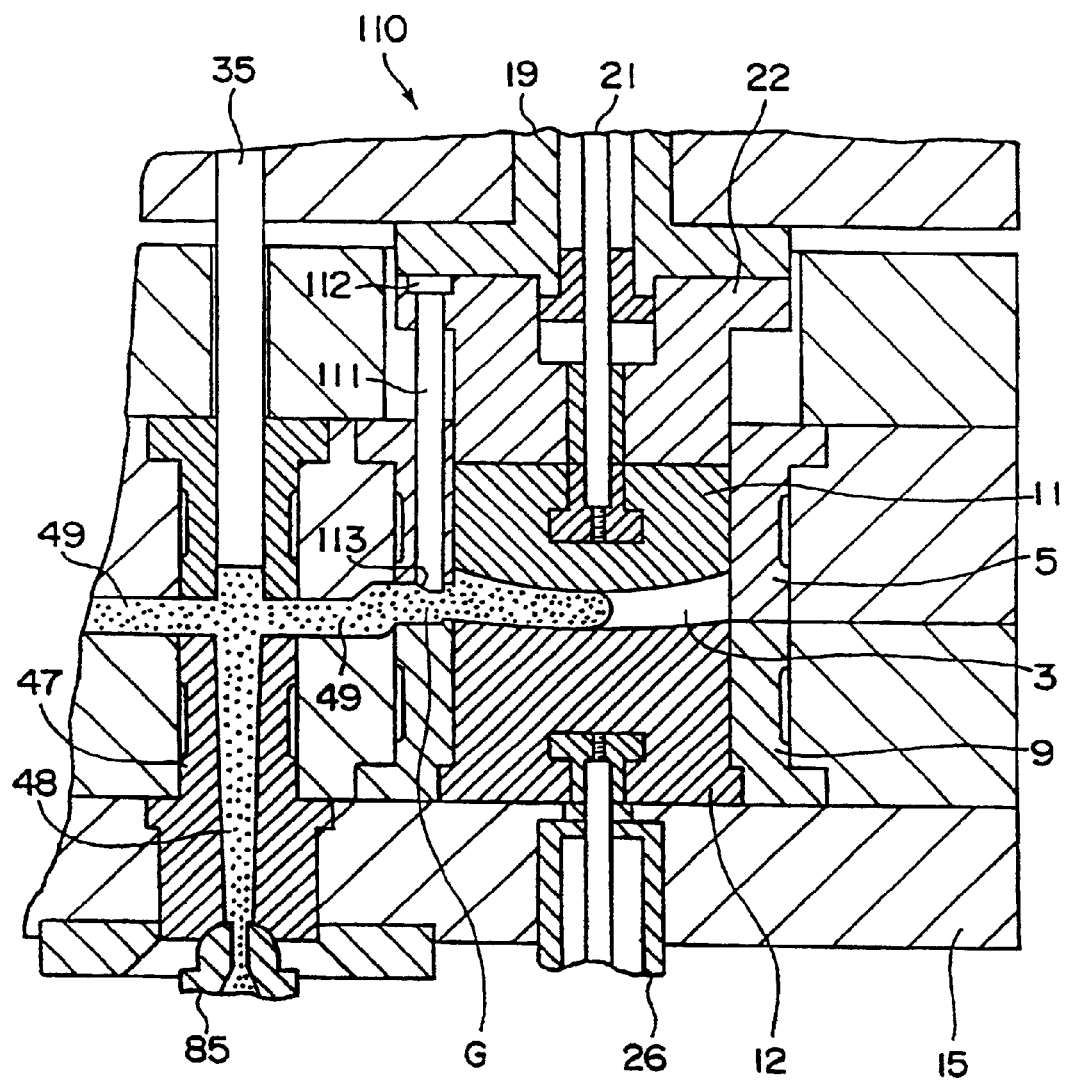
FIG. 9 is an enlarged cross-section showing a condition during injecting and filling molten resin in the condition shown in FIG. 8.
Figure 10:
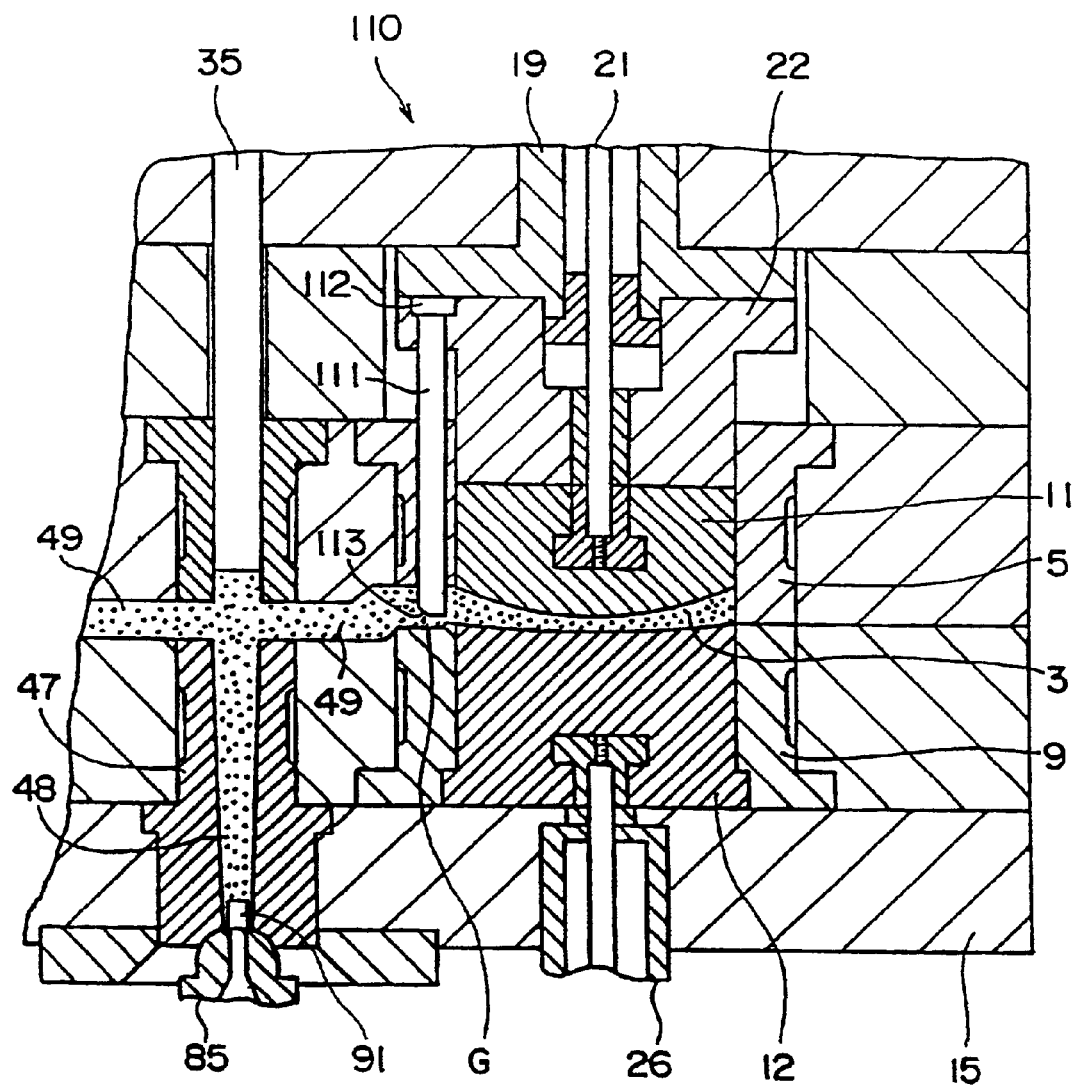
FIG. 10 is an enlarged cross-section showing a condition when the molten resin is compressed in the condition shown in FIG. 9.

Incidentally, FIG. 9 shows a condition when approximate 90% of an injection amount per one shot of the molten resin is injected from the condition shown in FIG. 8, and FIG. 10 shows a condition when the cavity volume is reduced from the condition shown in FIG. 9. In plus lens molding, FIG. 11 corresponds to the condition shown in FIG. 8 and FIG. 12 corresponds to a condition shown in FIG. 10.

Figure 13:
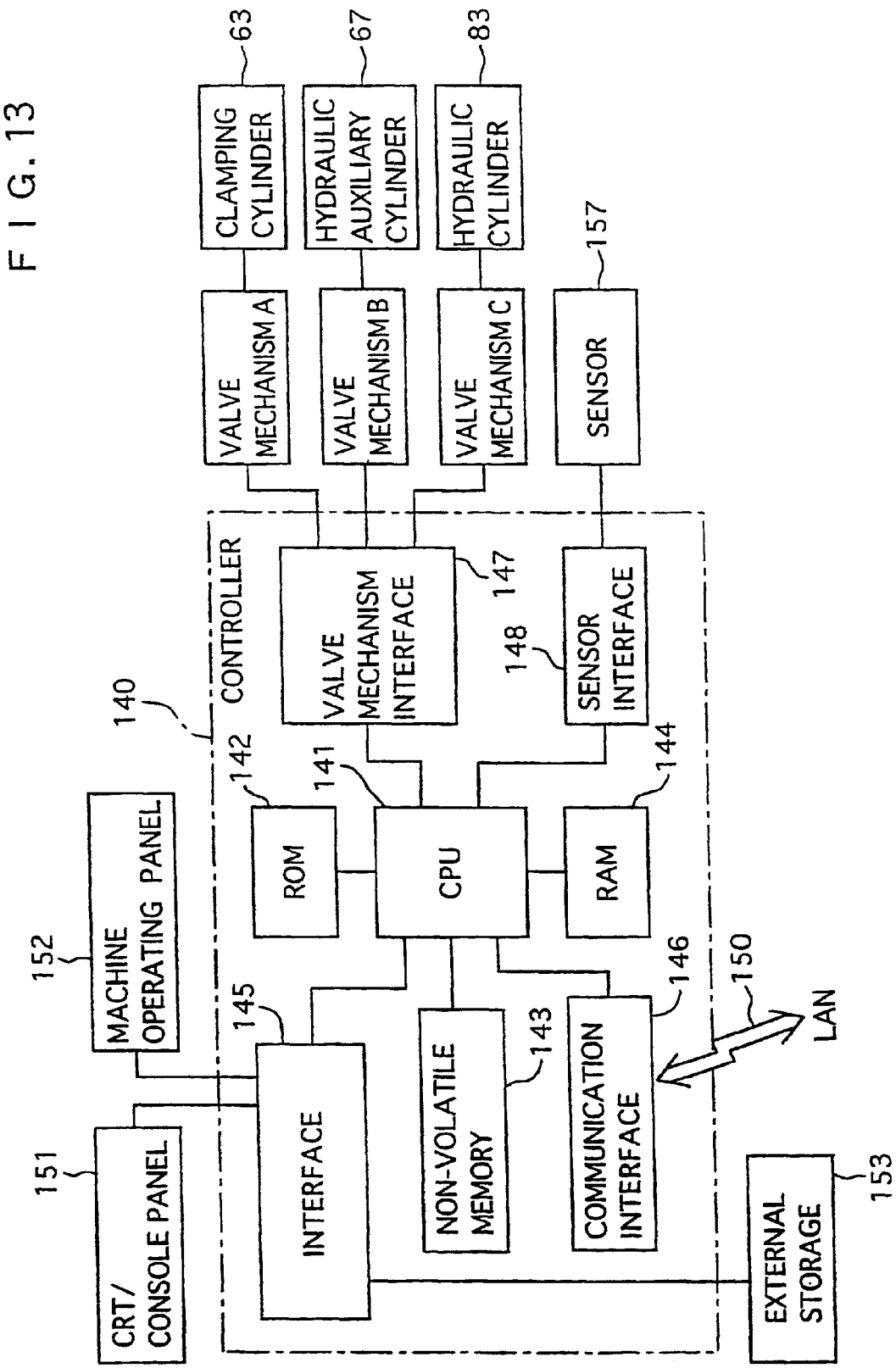
FIG. 13 is a block diagram showing function mainly for reducing a cavity volume and setting a gate in the aforesaid embodiment.

FIG. 13 mainly shows a controlling means for setting the cavity and the gate to a predetermined size and another controlling means for reducing the size of the cavity and the gate. In the figure, a controller 140 has a central processing unit (CPU) 141. A ROM 142 having a controlling program for controlling the entire injection compression molding machine stored therein, a non-volatile memory 143 for storing a parameter condition etc., a RAM 144 for temporally storing condition or the like, and various interfaces 145, 146, 147 and 148 are connected to the CPU 141.

A CRT/console panel 151, a machine operating panel 152 having an operation mode changing switch disposed thereon, and an external storage 153 are respectively connected to the interface 145. When the predetermined value of the cavity and the gate and the reducing condition value of the cavity and the gate are inputted from the CRT/console 151, these values are stored in the RAM 144, the non-volatile memory 143 or the external storage 153. When the predetermined value and the condition values are prepared by the external storage 153 and the communication (by below-mentioned LAN 150), these values can be loaded to the RAM 144 and the non-volatile memory 143.

A LAN 150 is connected to the communication interface 146, which enables a control through the network.

The clamping cylinder 63 is connected to the value mechanism interface 147 through a valve mechanism A having a known electro-hydraulic switching servo valve and a pressure control valve. Also, the hydraulic auxiliary cylinder 67 is connected to the valve mechanism interface 147 through a valve mechanism B for step-wise discharging oil in synchronization to a pulse, and the hydraulic cylinder 83 is connected to the valve mechanism interface 147 through a valve mechanism C having an electro-hydraulic switching servo valve.

Various sensors 157 such as a position sensor for detecting the position of the movable die plate 66 and for detecting the position of the plunger 81 inside the injection cylinder 82, a pressure sensor and a temperature sensor, are connected to the sensor interface 147.

Here, a function of the CPU 141 will be briefly described below.

The CPU 141 actuates the valve mechanism A and the valve mechanism B through the valve mechanism interface 147 to supply the clamping cylinder 63 and the hydraulic auxiliary cylinder 67 with oil to drive the piston. At this time, the CPU 141 monitors a current value signal from the position sensor for detecting the position of the movable die plate 66 and immediately shuts the flow channel of the valve mechanism B when the CPU 141 detects the current value signal reaches the predetermined value of the cavity and the gate stored in the RAM 144 and the non-volatile memory 143. Accordingly, the movable die plate 66 is stopped so that the cavity 3 and the gate G is set at a predetermined size.

After the cavity 3 and the gate G is set at the predetermined size, the CPU 141 drives the hydraulic cylinder 83 through the valve mechanism interface 147 and the valve mechanism C. Consequently, the molten resin is injected and filled into the cavity 3 through the sprue 48, the runner 49 and the gate G. In the meantime, the CPU 141 monitors a signal from the position sensor inputted through the sensor interface 148 (a position signal of the plunger 81 inside the injection cylinder 82). When the CPU 141 detects the signal reaches the reducing condition of the cavity 3 and the gate G stored in the RAM 144 and the non-volatile memory 143, the CPU 141 immediately unblocks the channel of the valve mechanism B. Accordingly, the clamping cylinder 63 advances by the movement of the valve mechanism A and the valve mechanism B. The size of the cavity 3 and the gate G are reduced by the advance of the clamping cylinder 63, thereby compressing the molten resin inside the cavity 3.

The function of the present embodiment will be described below.

First, the inserts 11 and 12 are exchanged in accordance with the type of the lens to be molded. In exchanging the inserts 11 and 12, the upper mold 1 including the die fitting member 16 are lifted to separate the upper mold 1 from the lower mold 2. Further, the piston rod 21 of the hydraulic cylinder 19 is lowered and the piston rod 28 of the hydraulic cylinder 26 is lifted, thus protruding the T-shaped clamp member 23 and 29 attached to an end of the piston rods 21 and 29 from the insert guide member 5 and 9 (see FIG. 14).

The inserts 11 and 12 newly attached to the die body 4 and 8 of the upper mold 1 and the lower mold 2 are horizontally moved while being retained by an arm of a robot (not shown) to engage the T-shaped groove 24 and 30 of the inserts 11 and 12 with the T-shaped clamp member 23 and 29. Subsequently, the insert 11 is moved upward by raising the piston rod 21 of the hydraulic cylinder 19 and the insert 12 is lowered by lowering the piston rod 28 of the hydraulic cylinder 26. Accordingly, the inserts 11 and 12 are fitted to the insert guide member 5 and 9.

As described above, in molding plus lens, the inserts are replaced to have the cavity 3 having thicker central portion than the periphery thereof. On the contrary, in molding minus lens, the inserts are replaced to have the cavity 3 having thinner central portion than the periphery thereof.

Figure 15:
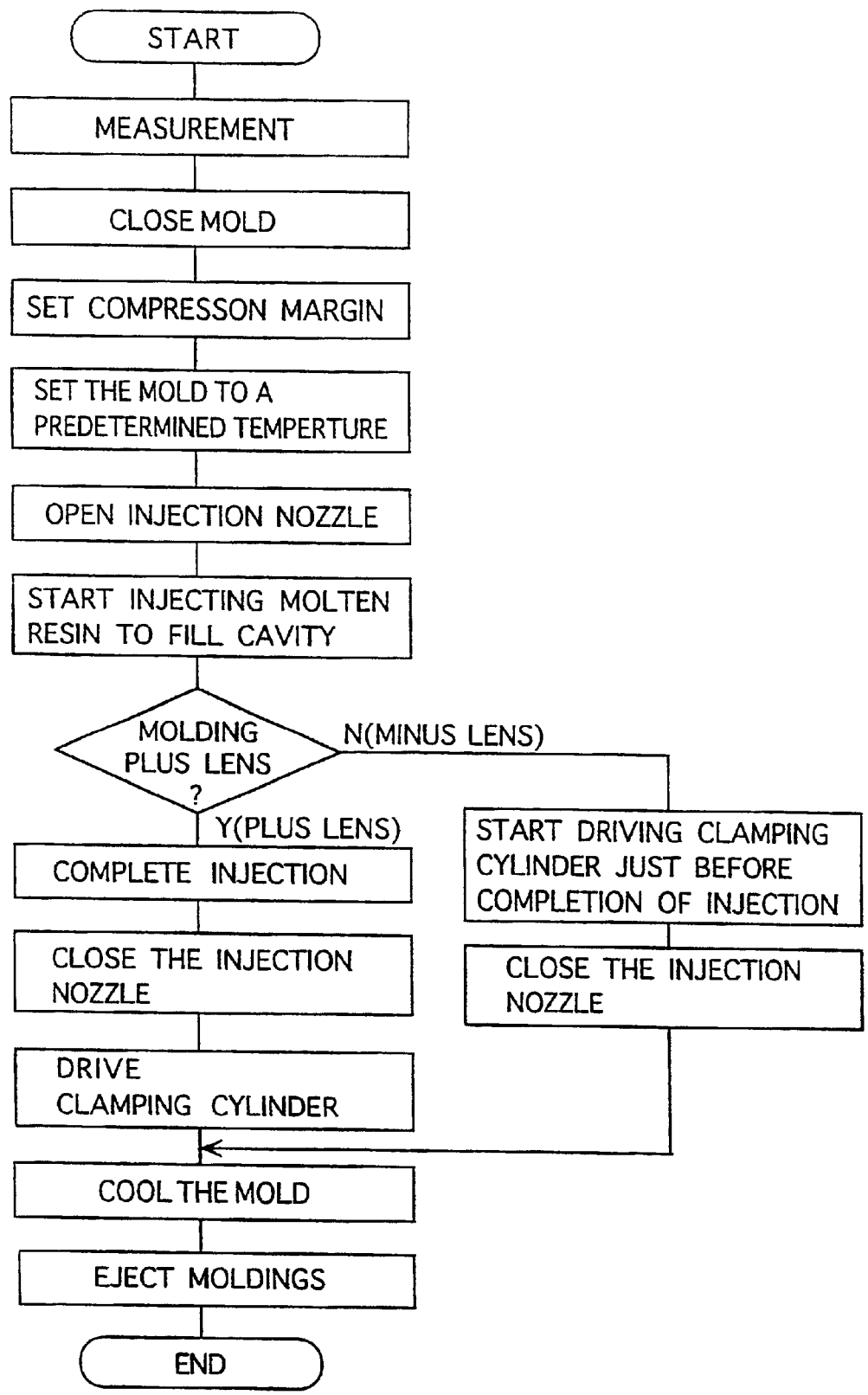
FIG. 15 is a flow chart showing a process for molding a lens in the aforesaid embodiment.

The spectacle lens having meniscus shape is molded in accordance with the flow chart of FIG. 15.

First, the molten resin plasticized by the plasticizing apparatus 70 is introduced into the injection cylinder 82 for measurement (measuring step). In this step, the molten resin necessary for the moldset 45 having two lens-molding cavity 3, the runner 49, the sprue 48 and the grip portion 46 is measured.

Next, the molding die 50 is closed. In other words, the upper mold 1 is lowered by the clamping cylinder 63 so that the die plate 6 of the upper mold 1 abuts the die plate 10 of the lower mold 2 and the plate spring 17A is not compressed (closing the mold as shown in FIGS. 2, 3 and 4). The margin S is set at the maximum opening amount (approximately 15 mm) in the above condition.

Next, the opening amount (compression margin) is set in accordance with the lens configuration. In this case, the opening amount is set as less than or the same as 0.8 mm in molding the plus lens, and the opening amount is set as more than 0.8 mm in molding minus lens. Especially, the opening amount is preferably set larger in accordance with the power of the lens for preventing the development of the weld line. The opening amount may not be set for respective lens power but can be set in a unit of a predetermined lens power range.

In molding plus lens, the die fitting member 16 is further lowered by driving the clamping cylinder 63 (the plate spring 17A is compressed at this time) to eliminate the margin S completely. Subsequently, the die fitting member 16 is raised by the opening amount against the clamping force of the clamping cylinder 63 by actuating the auxiliary cylinder 67 to set the opening amount. On the other hand, in molding minus lens, the die fitting member 16 is lowered to the position retaining the opening margin by driving the clamping cylinder 63 (the plate spring 17A is compressed at this time) and is stopped at the position to set the opening amount.

Figure 11:
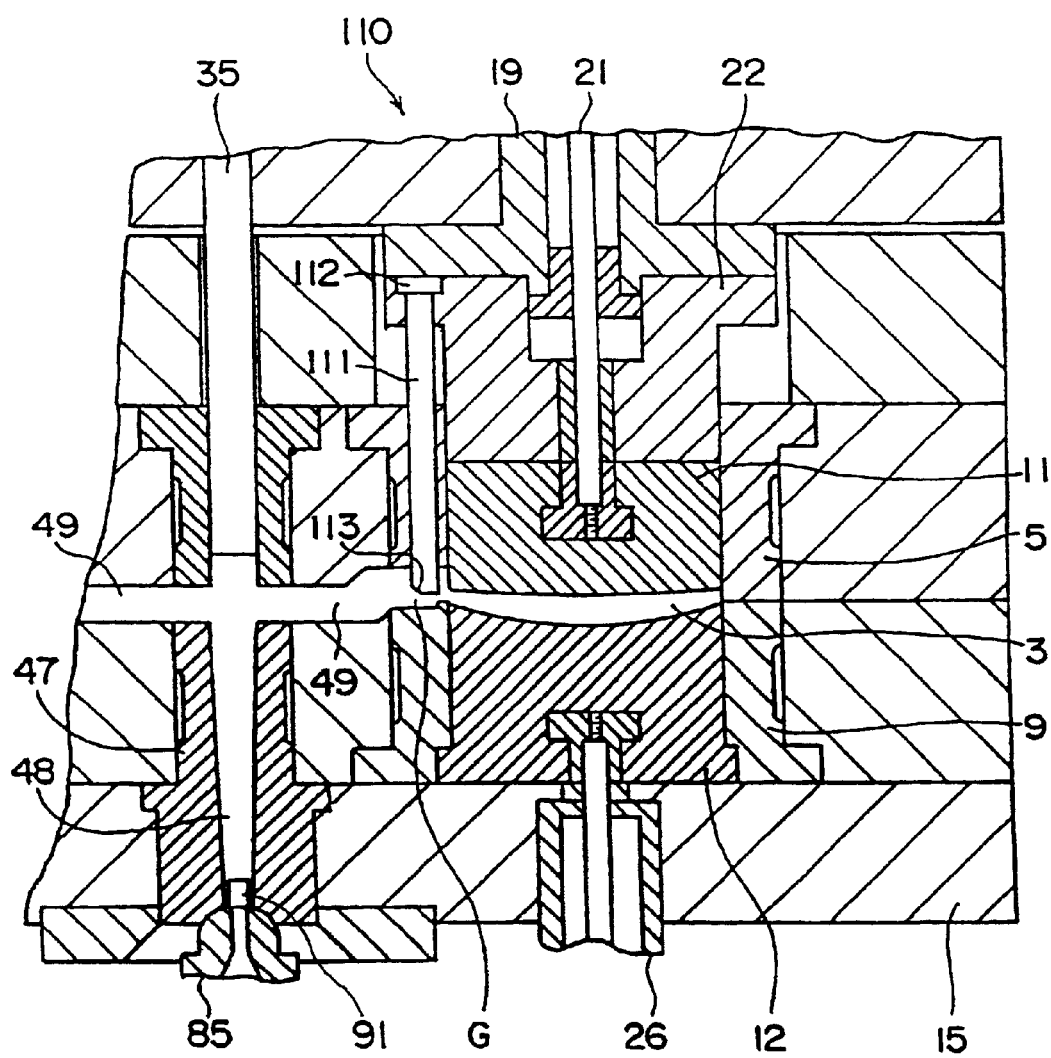
FIG. 11 is an enlarged cross-section showing a condition in molding plus lens in the aforesaid embodiment.

In this case, the mold condition is set as, for example, shown in FIG. 8 in molding minus lens, and is set as shown in FIG. 11 in molding plus lens. The nozzle shut pin 91 is protruded to shut the injection nozzle 85 in respective conditions.

Next, the molding die 50 is set at a predetermined temperature. Specifically, the molding die 50 is heated by supplying temperature-controlled temperature control fluid from the temperature control fluid feeder 52 to respective parts of the molding die 50 (such as the insert guide members 5 and 9, the upper mold insert 11 and the lower insert 12).

Subsequently, the injection nozzle 85 is opened. In other words, the nozzle shut pin 91 of the nozzle shut mechanism 90 is retreated from the inside of the sprue 48. Accordingly, the resin flow channel of the injection nozzle 85 blocked by the nozzle shut pin 91 is opened.

Then, the molten resin measured in the measuring step is injected into the moldset 45 through the channel of the injection nozzle 85. In other words, the molten resin measured by being introduced in the injection cylinder 82 of the injection apparatus 80 is injected by raising the plunger 81. Consequently, as shown in FIG. 9, the molten resin is filled into the cavity 3 through the injection nozzle 85, the sprue 48 of the sprue bush 47, the runner 49 and the gate G in molding the minus lens. Since a lower end of the gate shut pin 111 is not so protruded into the gate G, in other words, since the opening of the gate G is sufficiently secured, the resin flow is not hindered.

In molding the plus lens, after the injection nozzle 85 is closed by the nozzle shut mechanism 90, in other words, after an end of the path of the injection nozzle 85 is closed by protruding the nozzle shut pin 91 into the sprue 48 after completion of injecting and filling the molten resin, the clamping cylinder 63 is driven (lowered).

On the other hand, in molding minus lens, the clamping cylinder 63 is started to be driven just before completion of injecting and filling the molten resin. More specifically, when 90 to 95% of the molten resin injection is completed, the clamping cylinder 63 is started to be driven (lowered) and the injection nozzle 85 is shut after completion of injecting all of the molten resin by the nozzle shut mechanism 90.

When the clamping cylinder 63 is driven (lowered), the die fitting member 16 is pushed downward through the movable die plate 66 so that the insert 11 descends toward the insert 12, thereby reducing the volume of the cavity 3. Simultaneously, the gate shut pin 111 protrudes into the gate G to gradually close the opening of the gate G.

At this time, in molding plus lens, since the gate shut pin 111 protrudes into the gate G after completion of injecting and filling the molten resin, the flow of the molten resin toward the cavity 3 is not blocked by the gate G. On the other hand, in molding minus lens, the gate shut pin 111 protrudes into the gate G just before completion of injecting and filling the molten resin. However, since the protrusion timing is set after 90 to 95% of the molten resin is injected and the opening of the gate G is only slightly closed by the gate shut pin 111 at this time, the flow of the molten resin toward the cavity 3 is not blocked.

When the clamping cylinder 63 is driven (lowered) to reach a final position (including a position having no opening amount), in molding minus lens, the gate shut pin 11 protrudes into the gate G to make the opening of the gate G approximately closed, as shown in FIG. 10. At this time, the opening dimension of the gate G, more specifically, a clearance between a lower end of the gate shut pin 111 and the lower wall of the gate G is set less than 2 mm. Accordingly, the molten resin filled inside the cavity 3 is prevented from flowing back to the runner 49 from the gate G in cooling process.

Figure 12:
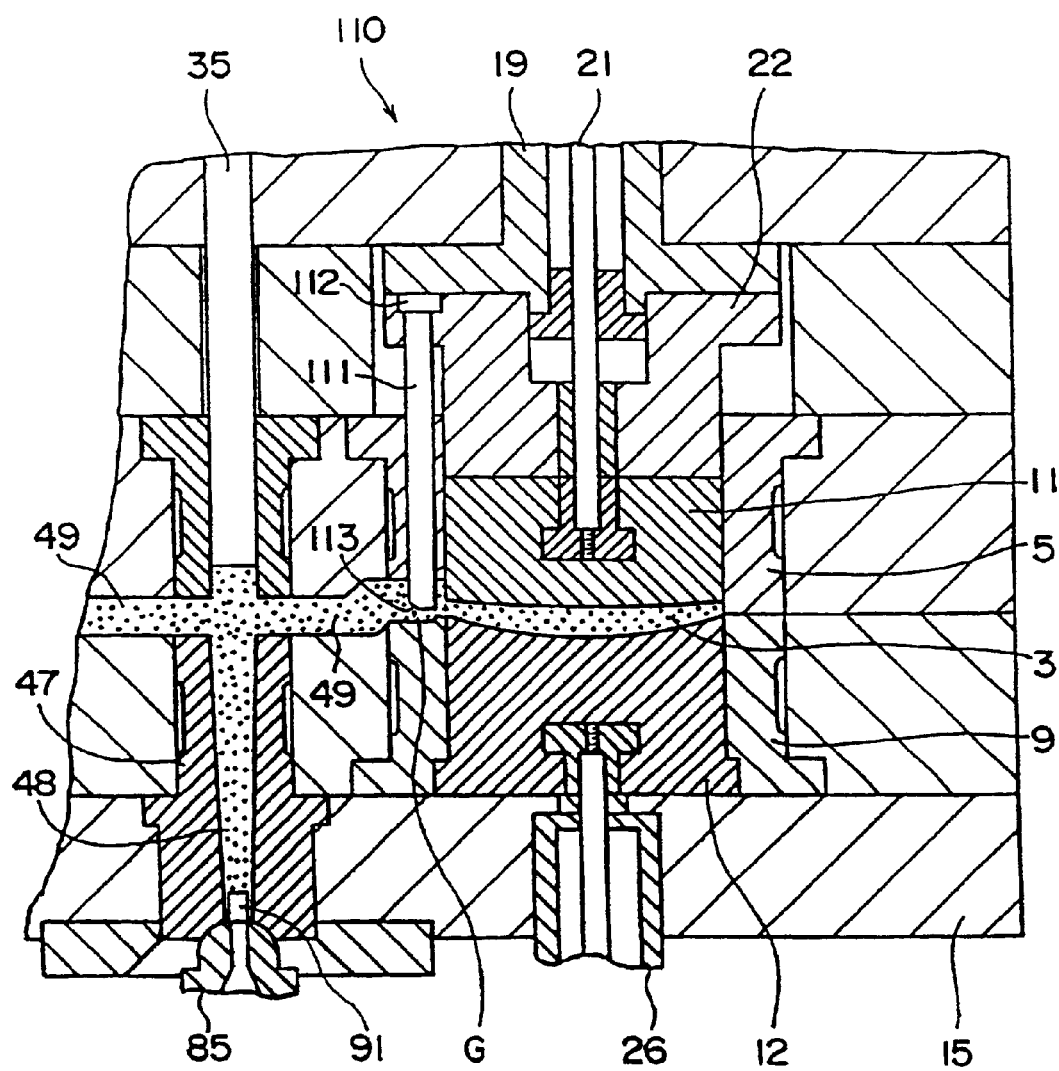
FIG. 12 is an enlarged cross-section showing a condition when molten resin is compressed after being injected and filled.

In molding plus lens, the gate shut pin 11 protrudes into the gate G to make the opening of the gate G approximately closed, as shown in FIG. 12.

Subsequently, while the molten resin filled in the cavity 3 is prevented from flowing back to the runner 49 from the gate G, the molding die 50 is cooled to solidify the thermoplastic resin during the pressurization and compression of the molten resin.

Figure 16:
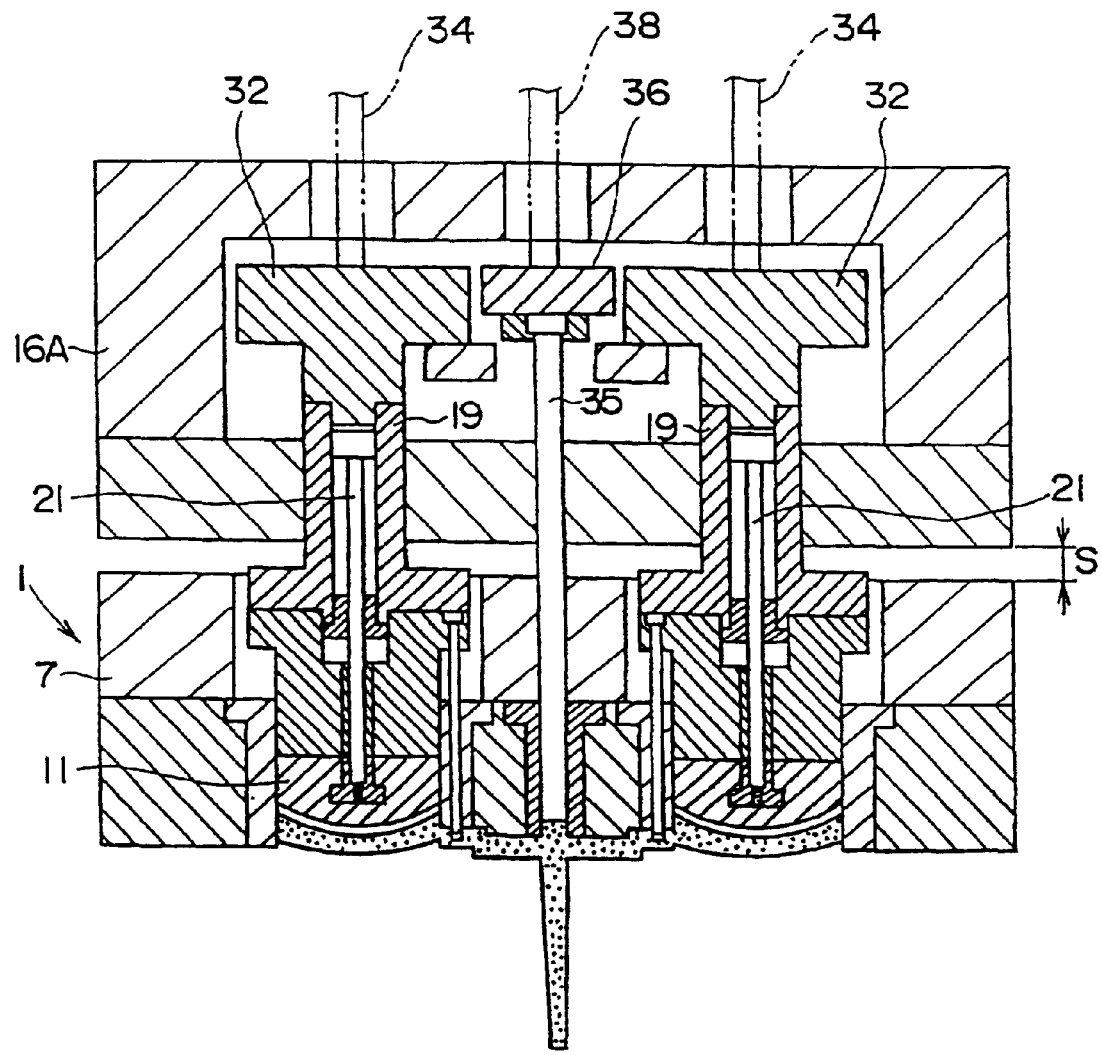
FIG. 16 is an illustration showing a condition in opening the mold in the aforesaid embodiment.
Figure 16:
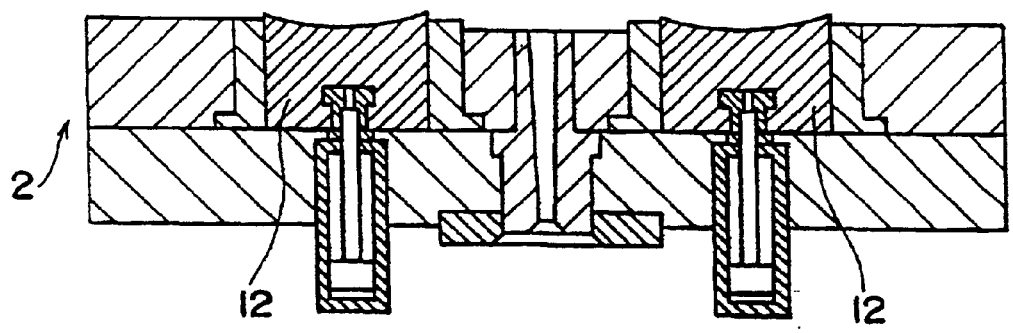
Figure 17:
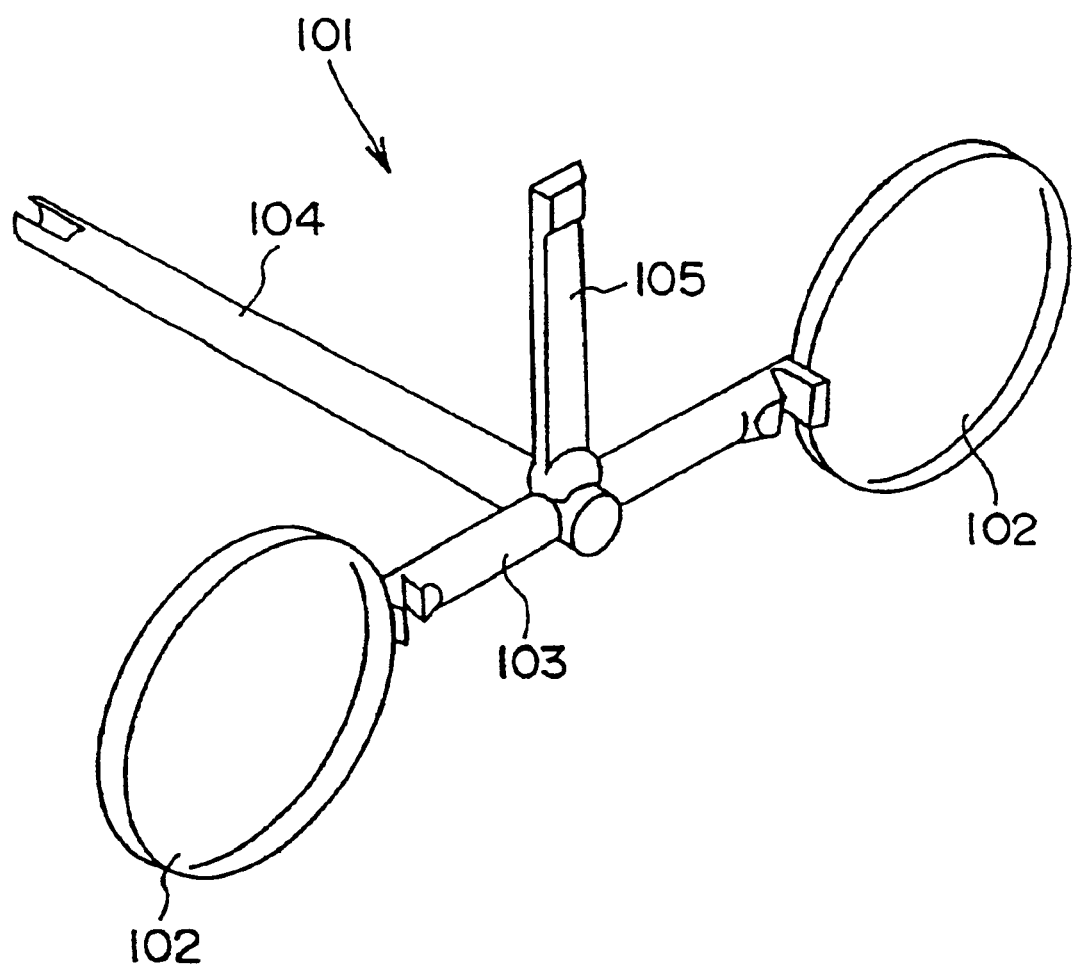
FIG. 17 is a perspective view showing a molding obtained in the aforesaid embodiment.

Finally, as shown in FIG. 16, the molding die is opened and the solidified object is ejected to obtain a molding 101 shown in FIG. 17. The molding 101 has two spectacle lenses 102 molded by the two lens-forming cavities 3, a connecting portion 103 molded by the runner 49 for connecting the two spectacle lenses 102, a stick portion 104 molded by the sprue 48 and extending from a central portion of the connecting portion 103 in a right angle toward thickness direction of the lens 102, and a grip 105 molded by the grip portion 46 and extending in a right angle relative to the connecting portion 103 and the stick portion 104.

Figure 18:
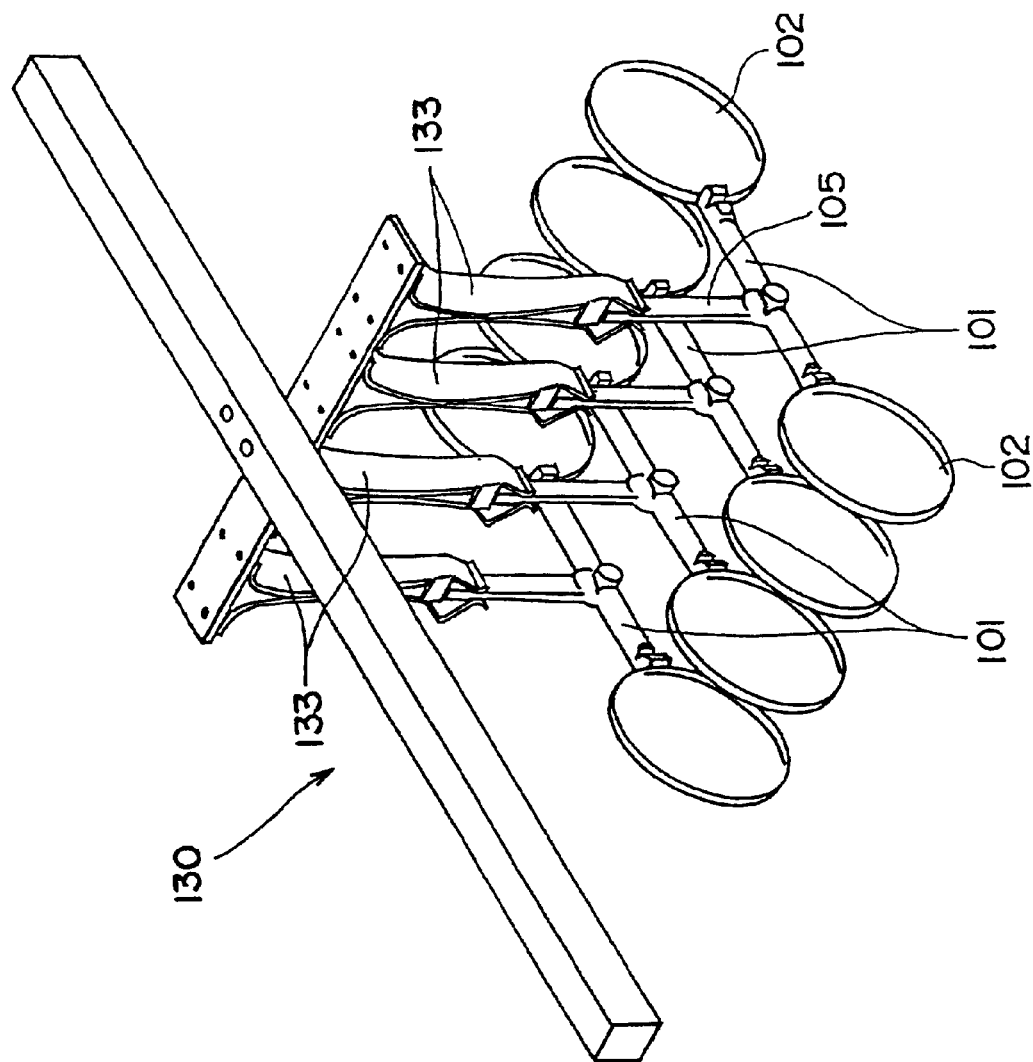
FIG. 18 is an illustration showing a coating process of the molding obtained in the aforesaid embodiment.

Thereafter, the lens 102 of the molding 101 is immersed in hardwearing hard coating fluid while the grip 105 of the molding 101 is held by a gripping member 133 of the immersing operation tool 130 shown in FIG. 18. Accordingly, since the lens 102 of the molding 101 can be immersed in the hardwearing hard coating fluid with the grip 105 being held, the immersing process can be facilitated.

After immersing the molding 101 for a predetermined time, the lens 102 and the connecting portion 103 is cut off by a cutter. Accordingly, the two spectacle lenses covered by a coating film by the hard coating fluid can be simultaneously obtained from a single molding 101.

According to the present embodiment, the gate shut pin 111 is provided to be protrudable into the gate G in synchronization with the movement of the insert 11. Therefore, since the gate shut pin 111 protrudes into the gate G to gradually close the opening of the gate G when the insert 11 moves toward the insert 12 to compress the molten resin (after the molten resin is completed to be injected into the cavity 3 in molding the plus lens, and after the 90 to 95% of the molten resin injection is completed in molding minus lens), the molten resin in the cavity 3 can be prevented from flowing back to the runner 49 from the gate G. Therefore, development of internal strain can be prevented, thereby obtaining spectacle lens having high accuracy and high quality.

Further, since the gate shut pin 111 is not so protruded into the gate G in setting the opening amount, the flow resistance against the molten resin is relatively small so that the fluidity of the molten resin can be ensured. Accordingly, it is not required to exchange the gate top member in accordance with the type of the lens to be molded, i.e. the plus lens and the minus lens.

Incidentally, in the aforesaid embodiment, the upper end 112 of the gate shut pin 111 is fixed while being sandwiched between the back insert 22 and the cylinder 19 and the lower end of the gate shut pin 111 is protruded into the gate G in synchronization of the descent of the insert 11 to close the opening of the gate G. However, the opening of the gate G may be closed by a gate shut mechanism having a driving means other than the driving means for lowering the insert 11.

Figure 19:
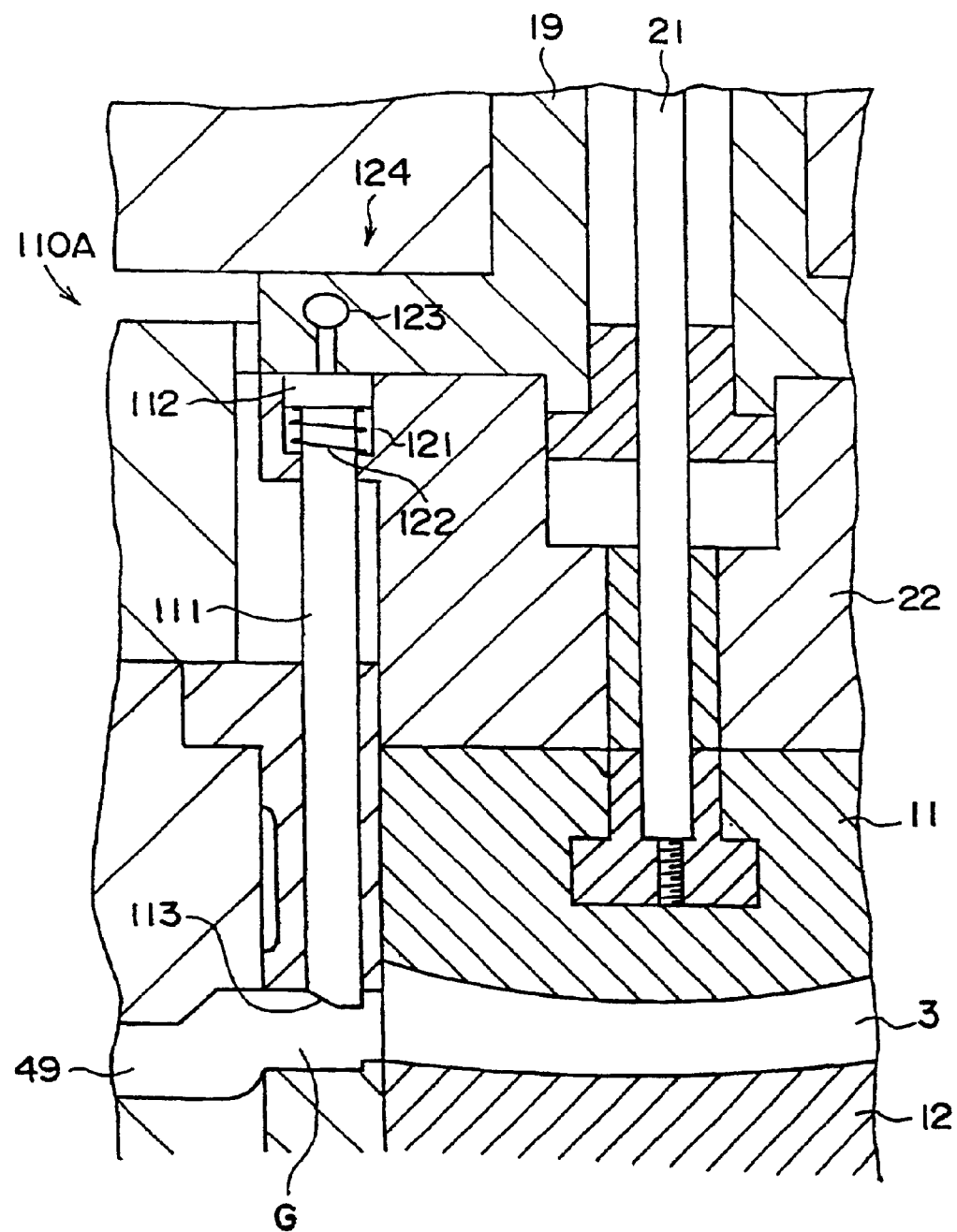
FIG. 19 is an enlarged cross-section showing another example of gate shut mechanism.

For instance, a gate shut mechanism 110A shown in FIG. 19 may be used. The gate shut mechanism 110A has a slide hole 121 formed on the back insert 22 elevatably moving together with the insert 11. The upper end 112 of the gate shut pin 111 is movably (in up and down direction) disposed in the slide hole 121 and a spring 122 for biasing the upper end 112 upward is accommodated in the slide hole 121. Further, a fluid channel 123 for discharging pressure fluid toward the upper end 112 is formed on an upper member (cylinder) 19 of the upper end 112 of the gate shut pin 111. Accordingly, the gate shut pin 111 can be elevatably moved independently of the movement of the insert 11 by supplying of the pressure fluid into the fluid channel 123. The slide hole 121, the spring 122 and the fluid channel 123 constitutes a driving mechanism 124 for moving the gate shut pin 111 independently of the insert 11.

Accordingly, since the gate shut pin 111 can be elevatably moved independently of the movement of the insert 11, the opening of the gate G can be shut by protruding the gate shut pin 111 into the gate G, for example, after completing the injection of the molten resin. Therefore, even when the molten resin is compressed by lowering the insert 11 to increase the pressure applied to the molten resin thereafter, the molten resin can be securely prevented from flowing back into the runner 49 from the gate G, since the opening of the gate G is closed.

Figure 20:
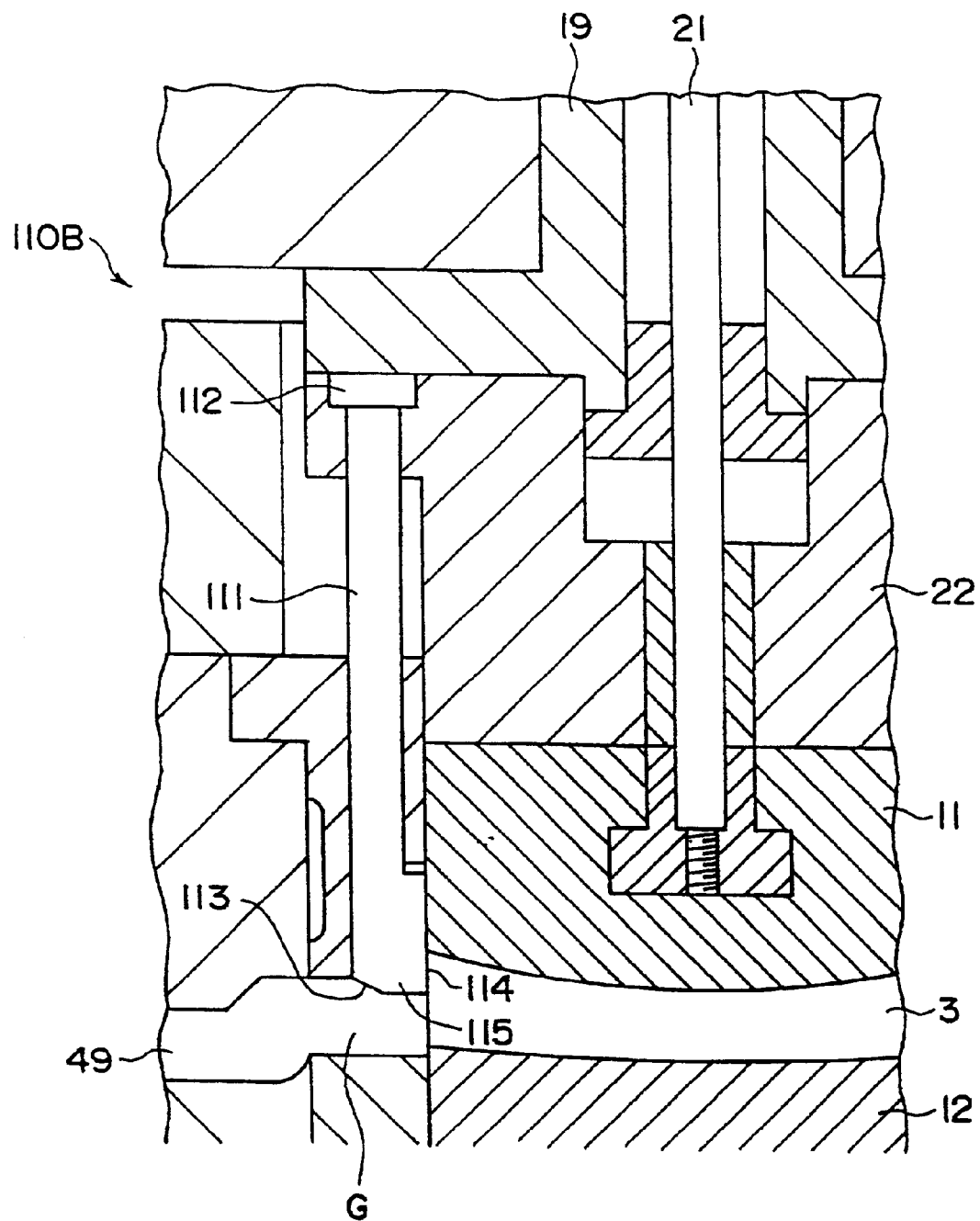
FIG. 20 is an enlarged cross-section showing still another example of gate mechanism.

Further, a gate shut mechanism 110B shown in FIG. 20 may also be used. As shown in FIG. 21, the gate shut mechanism 110B has a bulge 115 having a concave arc surface 114 corresponding to outer peripheral surface of the cavity 3 on the lower end of the gate shut pin 111 opposite to the slope 113. Accordingly, when the gate shut pin 111 completely closes the gate G, the lens 102 formed in the cavity 3 is completely divided from the gate G and the runner 49. Therefore, the lens shown in FIG. 22 can be obtained. According to the above molding method, an advantage of eliminating the need for later processing for cutting off the runner 49 from the lens 102 can be obtained.

In the above embodiment, the moldset 45 has two lens-forming cavities 3. However, the moldset 45 may have a single lens-forming cavity, or alternatively, more than two lens-forming cavities.

The moldset 45 has the grip portion 46. However, the grip portion 46 may be omitted.

The compression margin in molding process is set by the opening amount formed between the die body 4 and the die fitting member 16, but other molding die may be used. For instance, a molding die having a cavity core protruding into the cavity 3 may be used, in which the compression margin is set from the position of the cavity core and the molten resin is compressed by protruding the cavity core into the cavity 3.

In the aforesaid embodiment, in molding minus lens, the opening amount is started to be compressed when approximately 90 to 95% of the molten resin is injected. However, the percentage can be selectively determined in accordance with the volume of the cavity 3, the type of the resin, lens property or the like.

Though the injection compression molding apparatus for the spectacle lens is described in the aforesaid embodiment, the molding object is not limited to the spectacle lens but includes other lenses in general and optical disks other than lenses.

What is claimed is:

1. An injection compression molding method, comprising the steps of:
providing an openable/closable molding die having at least one cavity including a pair of relatively movable cavity forming members and a resin flow channel in communication with the cavity through a gate having a gate passage;

closing the molding die;

setting a size of the cavity by relatively moving the pair of cavity forming members to form a predetermined compression margin inside the cavity;

injecting molten resin to fill the cavity; and reducing the size of the cavity by relatively moving the pair of cavity forming members to compress the molten resin, the reducing starting during a time period that extends between a first time point prior to completion of injection of the molten resin and a second time point after the completion of the injection of the molten resin;

wherein the gate shuts the gate passage after completion of injecting the molten resin; and wherein an operation that shuts the gate passage is conducted during the relative movement of the pair of cavity forming members in reducing the size of the cavity to compress the molten resin.

2. The injection compression molding method according to claim 1, wherein the shutting-operation that shuts the gate passage is conducted by a second driving means independent of a first driving means for relatively moving the pair of cavity forming members to reduce the size of the cavity.

3. The injection compression molding method according to claim 1, wherein the cavity is a cavity for molding a spectacle lens having a meniscus configuration.

4. An injection compression molding method of molding a lens, comprising the steps of:

providing an openable/closable molding die having at least one cavity including a pair of relatively movable cavity forming members and a resin flow channel in communication with the cavity through a gate having a gate passage;

closing the molding die;

setting a size of the cavity by relatively moving the pair of cavity forming members to form a predetermined compression margin inside the cavity;

injecting molten resin to fill the cavity; and reducing the size of the cavity by relatively moving the pair of cavity forming members to compress the molten resin, the reducing starting during a time period that extends between a first time point prior to completion of injection of the molten resin and a second time point after the completion of the injection of the molten resin;

wherein the predetermined compression margin inside the cavity and a size of the gate passage are set in accordance with configuration properties of the lens to be molded;

wherein the gate passage is shut after completion of injecting the molten resin; and wherein operation that shuts the gate passage is conducted during the relative movement of the pair of cavity forming members in reducing the size of the cavity to compress the molten resin.

5. The injection compression molding method according to claim 4, wherein the size of the gate passage is controlled by a second driving means independent of a first driving means for setting and reducing the size of the cavity; and wherein the operation that shuts the gate passage is conducted by the second driving means.

6. The injection compression molding method according to claim 4, wherein the configuration properties of the lens to be molded are defined for a group of lenses within a range of lens powers.

7. An injection molding machine, comprising:

an openable/closable molding die having at least one cavity including a pair of relatively movable cavity forming members and a resin flow channel in communication with the cavity through a gate having a rate passage;

cavity setting means for closing the molding die and for relatively moving the pair of cavity forming members to set the size of the cavity so that a predetermined compression margin is formed inside the cavity;

injection means for injecting a molten resin to fill the cavity set by the cavity setting means;

cavity reduction means for relatively moving the pair of cavity forming members to reduce the size of the cavity to compress the molten resin, the reducing starting during a time period that extends between a first time point prior to completion of injection of the molten resin and a second time point after the completion of the injection of the molten resin; and gate control means for shutting the gate passage after completion of injecting the molten resin and during the relative movement of the pair of cavity forming members in reducing the size of the cavity to compress the molten resin.

8. The injection compression molding machine according to claim 7, wherein the gate control means includes a gate shut member protrudable into the gate passage, the gate shut member being fixed to a movable-side cavity forming member of the pair of cavity forming members.

9. The injection compression molding machine according to claim 7, wherein the gate control means has a gate shut member protrudable into the gate passage, the gate shut member being provided to a movable-side cavity forming member of the pair of cavity forming members and movable in a movable direction of the movable-side cavity forming member, further comprising driving means for moving the gate shut member independently of the movable-side cavity forming member.

10. The injection compression molding machine according to claim 7, wherein the pair of cavity forming members comprise optical inserts for molding a spectacle lens disposed in the molding die independently of the gate, the optical inserts being exchangeable in accordance with a power of the lens to be molded.

11. The injection compression molding method according to claim 1, wherein the step of shutting the gate passage occurs at a movable-side cavity forming member of the pair of cavity forming members.

12. The injection compression molding method according to claim 1, further comprising the step of operating an injection nozzle shut mechanism to stop the injection of the molten resin.

13. The injection compression molding method according to claim 4, wherein the step of shutting the gate passage occurs at a movable-side cavity forming member of the pair of cavity forming members.

14. The injection compression molding method according to claim 4, further comprising the step of operating an injection nozzle shut mechanism to stop the injection of the molten resin.

15. The injection compression molding machine according to claim 7, wherein said resin flow channel includes a sprue and a runner providing a path for the molten resin from said injection means to said cavity.

16. The injection compression molding machine according to claim 15, wherein the gate passage is located between the cavity and the runner.

17. The injection compression molding machine according to claim 15, further comprising an injection nozzle shut mechanism for stopping the injection of the molten resin to the cavity through the sprue.

18. The injection compression molding machine according to claim 7, further comprising an injection nozzle shut mechanism to stop the injection of the molten resin.

19. The injection compression molding machine according to claim 7, wherein the gate comprises a gate pin that moves with one of said cavity forming members to restrict flow of the molten resin between said cavity and said resin flow channel.

20. An injection molding machine, comprising:
- an openable/closable molding die having at least one cavity including a pair of relatively movable cavity forming members and a resin flow channel in communication with the cavity through a gate having a gate passage;
- cavity setting means for closing the molding die and for relatively moving the pair of cavity forming members to set the size of the cavity so that a predetermined compression margin is formed inside the cavity;
- setting means for setting the predetermined compression margin and size of the gate passage in accordance with a configuration of a lens to be molded;
- injection means for injecting a molten resin to fill the cavity set by the cavity setting means;
- cavity reduction means for relatively moving the pair of cavity forming members to reduce the size of the cavity, when a minus lens is molded by moving the pair of cavity forming members to compress the molten resin just before completion of injecting the molten resin, and when a plus-lens is molded by moving the pair of cavity forming members to reduce the size of the cavity to compress the molten resin after completion of injecting the molten resin; and
- gate control means for shutting the gate passage after completion of injecting the molten resin, wherein the gate control means begins to shut the gate passage during the relative movement of the pair of cavity forming members by the cavity reduction means to compress the molten resin.

* * * * *